(12) United States Patent
Hong et al.

(10) Patent No.: US 7,995,688 B2
(45) Date of Patent: Aug. 9, 2011

(54) CHANNEL ESTIMATION AND ICI CANCELLATION FOR OFDM

(75) Inventors: Zhihong Hong, Nepean (CA); Liang Zhang, Ottawa (CA); Louis Thibault, Gatineau (CA)

(73) Assignee: Her Majesty the Queen in right of Canada, as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 673 days.

(21) Appl. No.: 12/073,687

(22) Filed: Mar. 7, 2008

(65) Prior Publication Data

US 2008/0219371 A1 Sep. 11, 2008

Related U.S. Application Data

(60) Provisional application No. 60/905,603, filed on Mar. 8, 2007.

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........................................ 375/346; 375/285

(58) Field of Classification Search .................. 375/224, 375/259–260, 285, 316, 340, 346, 348
See application file for complete search history.

(56) References Cited

U.S. PATENT DOCUMENTS

| | | | |
|---|---|---|---|
| 7,054,354 B2 | 5/2006 | Gorokhov et al. | |
| 7,120,209 B2 | 10/2006 | Gorokhov et al. | |
| 7,206,349 B2 | 4/2007 | Linnartz et al. | |
| 7,228,113 B1 * | 6/2007 | Tang et al. | 455/101 |
| 7,230,990 B2 | 6/2007 | Gorokhov et al. | |
| 7,558,337 B2 * | 7/2009 | Ma et al. | 375/316 |
| 7,583,755 B2 * | 9/2009 | Ma et al. | 375/316 |
| 7,782,967 B2 * | 8/2010 | Cheng et al. | 375/260 |
| 7,792,203 B2 * | 9/2010 | Liu | 375/260 |
| 2004/0005010 A1 * | 1/2004 | He et al. | 375/260 |
| 2006/0262869 A1 * | 11/2006 | Yoshida | 375/260 |
| 2008/0095256 A1 * | 4/2008 | Primo et al. | 375/260 |
| 2008/0219371 A1 * | 9/2008 | Hong et al. | 375/260 |
| 2009/0129493 A1 * | 5/2009 | Zhang et al. | 375/260 |

OTHER PUBLICATIONS

Russell et al. "Interchannel Interference Analysis of OFDM in a Mobile Environment", (IEEE VTC '95, 1995, pp. 820-824).

* cited by examiner

*Primary Examiner* — Jean B Corrielus
(74) *Attorney, Agent, or Firm* — Freedman & Associates

(57) ABSTRACT

An iterative channel estimation and inter-carrier interference (ICI) cancellation process is provided for OFDM receivers, and more particularly for mobile OFDM receivers. The iterative process uses decision feedback to estimate both the channel gain and the ICI gains, the latter being the multiplicative gain applied to the adjacent sub-carriers. Thus the receiver performs equalization and ICI cancellation in an iterative fashion and is advantageous for estimating fast fading channels.

41 Claims, 25 Drawing Sheets

CHANNEL ESTIMATION AND ICI CANCELLATION FOR OFDM

This application claims benefit from U.S. Provisional Application No. 60/905,603 filed Mar. 8, 2007.

FIELD OF THE INVENTION

The invention relates to wireless receivers, and more particularly to equalization of channel carriers and reduction of inter-carrier interference for OFDM receivers.

BACKGROUND

In recent years wireless and RF technology have dramatically changed our perceptions, use, and reliance upon portable electronic devices. The uses of wireless technology are widespread, increasing, and include but are not limited to telephony, Internet e-mail, Internet web browsers, global positioning, photography, diary, address book, and in-store navigation. Additionally, devices incorporating wireless technology have expanded to include not only cellular telephones, but Personal Data Analyzers (PDAs), laptop computers, palmtop computers, gaming consoles, printers, telephone headsets, portable music players, point of sale terminals, global positioning systems, inventory control systems, and even vending machines. Today many of these devices are high volume consumer commodities where both carriers and portable electronic device manufacturers compete for the users' money through features, network coverage, signal strength and clarity (bit error rate) while reinforcing customers desires for small and lightweight devices, long battery life, increased roaming, guaranteed connectivity and increased digital download speeds.

Amongst the multiple standards and technologies, Orthogonal Frequency-Division Multiplexing (OFDM), has reached commercial deployment and success through its use within many applications including, but not limited to:

ADSL, SDSL and VDSL broadband access via POTS copper wiring;
Wi-Fi Wireless Local Area Networks, according to IEEE 802.11;
WiMAX Wireless Metropolitan Area Networks, according to IEEE 802.16;
Mobile Broadband Wireless Access (MBWA) systems, according to IEEE 802.20;
Digital Audio Broadcasting (DAB);
Digital Video Broadcasting for terrestrial digital TV (DVB-T);
Fast Low-latency Access with Seamless Handoff (FLASH) cellular infrastructure for packet-switched cellular networks;
Power line communications (PLC) for providing home networking on residential electrical power cabling; and
Multimedia over Coax Alliance (MoCA) for home networking over in-home coaxial cable.

Many of these OFDM portable electronic devices are mobile, as they are associated with users performing tasks as they move, and in many instances the users will be highly mobile as they use these electronic devices in their personal vehicles, or in public transportation such as buses, taxis and trains. For such OFDM systems these high mobility environments provide significant challenges to the system designers in two different aspects. On the one hand, due to the Doppler induced Inter-Carrier Interference (ICI), an accurate estimation of the Channel Frequency Response (CFR) at each sub-carrier is difficult to obtain. On the other hand, in fast fading environments, even with perfect CFR estimation, ICI likely causes severe degradation of the system performance. These factors result in incorrect determination of received symbols, thereby providing degraded signal quality to the user.

For fast fading channels, various channel estimation techniques have been developed based on the availability of time or frequency-domain pilots.

For channel estimation with time-domain pilots, an entire OFDM symbol is normally inserted periodically as pilot symbol. In order to maintain the performance, the space between two adjacent pilot symbols is less than $1=(2 \cdot fd \cdot Ts)$ symbols, where $fd \cdot Ts$ is the normalized fading rate, $fd$ is the maximum Doppler spread and $Ts$ is the useful OFDM symbol duration. Therefore, the system throughput decreases quickly with increase of the fading rate due to the increased pilot symbol rate.

To reduce such throughput loss, pilot symbols with shorter duration than the OFDM symbol have been used. Nevertheless, for the systems with only frequency domain pilots, where a subset of sub-carriers is dedicated as pilot sub-carriers, e.g. DVB-T, frequency-domain pilot-aided channel estimation is the only choice. It has been shown that time-varying channels also provide time diversity that has been exploited to improve the error performance. However, exploiting time diversity strongly hinges on accurate estimation of the channel matrix, including both the effects of channel gain, which is defined as the channel frequency response at the kth subcarrier, and ICI gains, which represent the multiplicative gains applied to the neighbor sub-carriers.

It would be advantageous to provide receivers with a simple process for estimating channel gain and ICI interference of fast fading channels.

SUMMARY OF EMBODIMENTS OF THE INVENTION

In accordance with an embodiment of the invention there is provided a method comprising: a) receiving a signal, the signal comprising a plurality of subcarriers; b) processing the signal by performing pilot-aided channel estimation for determining a first estimate of frequency domain channel gain at each subcarrier; c) determining a decision signal in dependence upon the first estimate of channel gain at each subcarrier; d) determining an estimate of channel gain at each subcarrier corresponding to a diagonal vector of a channel frequency response matrix and an estimate of inter carrier interference gains at each subcarrier corresponding to off-diagonal vectors of the channel frequency response matrix in dependence upon the received signal and the decision signal; e) canceling inter carrier interference in dependence upon the estimate of channel gain at each subcarrier and the estimate of inter carrier interference gains at each subcarrier and determining a decision signal; f) repeating d) and e) until a stopping criterion is satisfied; and, g) providing the decision signal.

In accordance with another embodiment of the invention there is provided a method comprising:
receiving a signal, the signal comprising a plurality A of active subcarriers and a plurality B of null subcarriers;
determining a channel frequency response over an extended spectrum in dependence upon the received signal, wherein virtual pilots are added to a null spectrum corresponding to the null subcarriers such that the channel frequency response has smooth transition on boundaries between an active spectrum and the null spectrum;
determining an estimate of channel gain at each active subcarrier in dependence upon the channel frequency response;

applying a shaping window to the extended spectrum to reduce the discontinuity on the periodical boundary of the digital frequency response; and, providing the estimate of channel gain at each active subcarrier.

In accordance with another embodiment of the invention there is provided a method determining a channel frequency response in dependence upon frequency domain pilots with non-factor of 2 spacing.

In accordance with another embodiment of the invention there is provided a receiver comprising: an input port for receiving a signal, the signal comprising a plurality of subcarriers; a pilot-aided channel estimator connected to the input port, the pilot-aided channel estimator for processing the signal by performing pilot-aided channel estimation for determining a first estimate of channel gain at each subcarrier; a decision block connected to the pilot-aided channel estimator and to the input port, the decision block for determining a decision signal in dependence upon an estimate of channel gain at each subcarrier and an estimate of inter carrier interference gains at each subcarrier; an output port connected to the decision block for providing the decision signal; and, a decision aided channel estimation block connected to the input port, the decision block and to a node interposed between the decision block and the output port, the decision aided channel estimation block for determining an estimate of channel gain at each subcarrier corresponding to a diagonal vector of a channel frequency response matrix and an estimate of inter carrier interference gains at each subcarrier corresponding to off-diagonal vectors of the channel frequency response matrix in dependence upon the received signal and the decision signal and for providing the estimate of channel gain and inter carrier inference gains at each subcarrier to the decision block.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1:
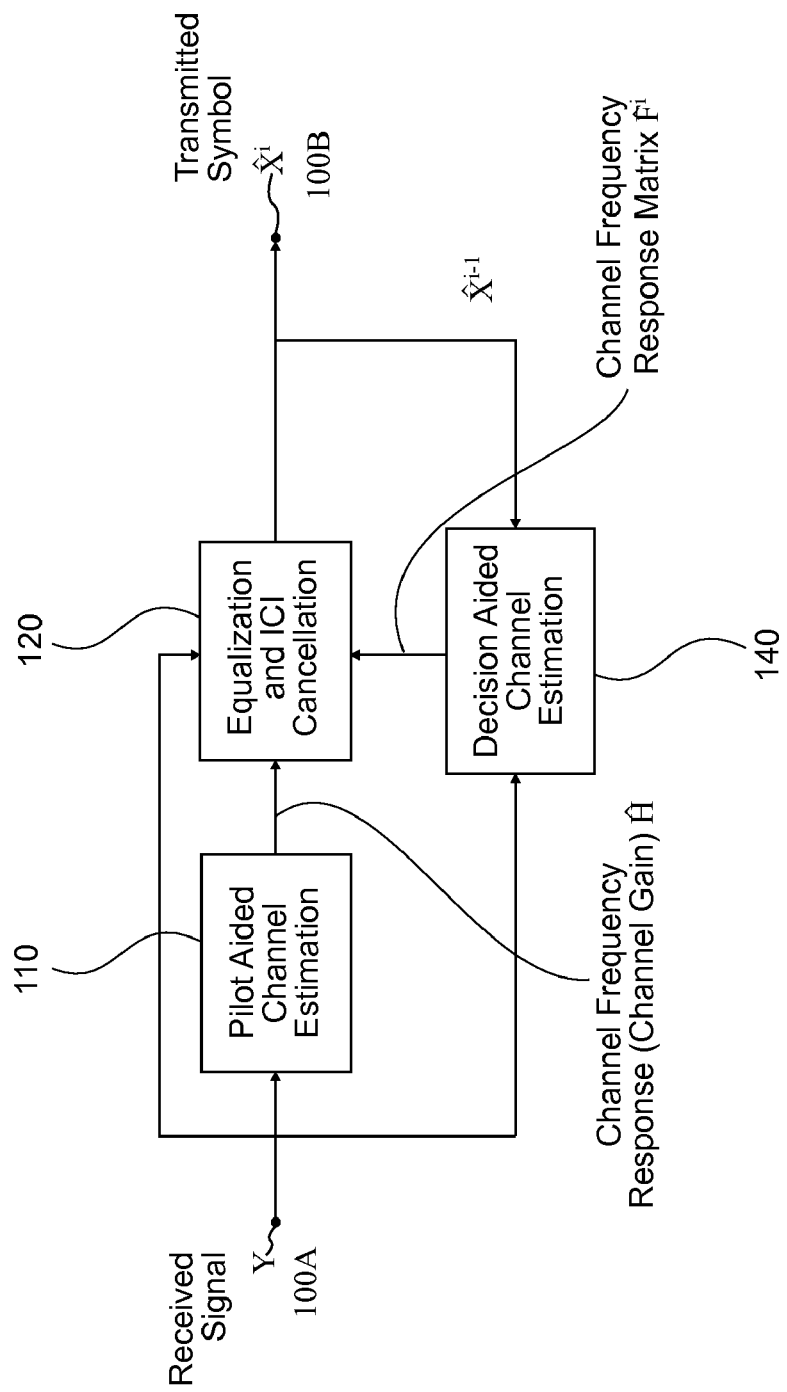
FIG. 1 illustrates schematically the functioning blocks of the iterative channel estimation and ICI cancellation process according to an embodiment of the invention.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

In the description hereinbelow and in the claims mathematical terms such as maximum, etc. are used for clarity, but as is evident to one skilled in the art these terms are not be considered as being strictly absolute but also include degrees of approximation depending, for example, on the application or technology.

Consider an Orthogonal Frequency-Division Multiplexing (OFDM) system operating with N tones and bandwidth $B_w$. The OFDM symbol duration is therefore $T_s=N=B_w$, and the sample duration is $T_c=1=B_w$. Now consider $X_k$ and $x_n$ as denoting the input and output sequences of an Inverse Discrete Fourier Transform (IDFT) performed at the OFDM transmitter respectively, $0 \leq k$; $n \leq N$, where k is the sub-carrier index, and n is the time index. Now consider that within the OFDM system we have a multi-path fading channel with a maximum delay spread of L OFDM samples, where L is the maximum multi-path delay value in multiples of $T_c$. It is assumed that a guard interval with length $N_g$, L is inserted before transmission to avoid Inter-Symbol Interference (ISI).

The received signal at the nth sample duration is therefore given by $$y_n = \sum_{l=0}^{L-1} h_{n,l} x_{n-l} + z_n, \tag{1}$$

where $h_{n,l}$ is the gain of the lth path at time n, and $z_n$ are independent and identically distributed complex Gaussian random processes with zero mean and variance $\sigma^2 n = (1/\text{Signal-Noise Ratio})$. Assuming perfect time and frequency synchronization, after removing the guard interval and applying a Discrete Fourier Transform (DFT) at the receiver, the received signal at the kth sub-carrier is written according to Russell et al "Inter-channel interference analysis of OFDM in a mobile environment," (IEEE VTC '95, 1995, pp. 820-824) as $$Y_k = H_k X_k + \sum_{m=0, m \neq k}^{N-1} I_{m-k,k} X_m + Z_k = H_k X_k + C_k + Z_k, \tag{2}$$

where Hk is the Channel Frequency Response (CFR) at the kth sub-carrier, hereinafter labeled as the channel gain, and is given by $$H_k = \sum_{l=0}^{L-1} G_{0,l} e^{-j2\pi kl/N}. \tag{3}$$

$I_{m-k;\,k}$ is the multiplicative ICI gain in the ICI contributed by the mth sub-carrier onto the kth sub-carrier, and is given by $$I_{m-k,k} = \sum_{l=0}^{L-1} G_{m-k,l} e^{-j2\pi ml/N}, \tag{4}$$

where $$G_{m-k,l} = \frac{1}{N} \sum_{n=0}^{N-1} h_{n,l} e^{j2\pi n(m-k)/N}. \tag{5}$$

Now let $Y=[Y_0, \ldots, Y_{N-1}]^T$ and $X=[X_0, \ldots, X_{N-1}]^T$ denote the received and transmitted vectors, where T is a transpose operation. The received signals are then written in a compact matrix form as $$Y = FX + N \tag{6}$$

where F is the channel frequency response matrix which includes the effect of both channel gain and ICI gains, denoted by $F_{k,k}=H_k$ and $F_{m,k}=I_{m-k,k}$, and $m \neq k$. When the channel is static or its variation is slow enough for the channel to be considered constant over the OFDM symbol duration, then F reduces to a diagonal matrix. In this case, there are various existing channel estimation techniques applicable to estimate the channel gain. In the case of time-varying channels, F becomes a non-diagonal matrix, and both the diagonal and off diagonal terms in F are estimated in order to facilitate the ICI cancellation and thus to achieve satisfactory error performance. Hereinbelow, the term "channel estimation" will refer to an estimation of both the channel gain and the ICI gains.

The term $C_k$ in Eq. 2 is the total ICI noise at the kth sub-carrier. For sufficiently large N, $C_k$ is modeled as a Gaussian random process from the central limit theorem according to Russell et al. Since the process estimates the individual ICI gain as $I_{m-k;\,k}$ such that its corresponding ICI contribution in $C_k$ is canceled out by the receiver to improve the receiver error performance, it is relevant to look at the statistical property of $I_{m-k;\,k}$ instead of $C_k$.

The ICI generating mechanism is well known in the art and, therefore, not presented herein for brevity. In order to provide an understanding of the channel estimation technique according to an embodiment of the invention the derivation of the autocorrelation of the ICI gain, is outlined hereinbelow. Considering the typical Wide-Sense Stationary Uncorrelated Scattering (WSSUS) model of Jake and Rayleigh fading, we have $$E\{h_{n,l} h^*_{n-p,l-q}\} = J_0(2\pi f_d p T_c) \sigma_l^2 \delta_q \tag{7}$$

where $J_0(\bullet)$ is the zero-order Bessel function of the first kind, $\sigma^2_l$ is the variance of the lth tap, $$\sum_{l=0}^{L-1} \sigma_l^2 = 1,$$

and $\delta_q$ is the Kronecker delta function.

Specifically, we want to analyze how $I_{m-k,k}$ varies with respect to sub-carrier index k, while (m−k) remains constant. To simplify the notation, let p=m−k. The autocorrelation of $I_{p;\,k}$ is written as $$\rho(r) = E\{I_{p,k} I^*_{p,k+r}\} = \frac{A}{N^2} \sum_{l=0}^{L-1} \sigma_l^2 e^{j2\pi lr/N}, \tag{8}$$

where we define $$A = \sum_{n=0}^{N-1} \sum_{n'=0}^{N-1} J_0(2\pi f_d(n-n')T_c) e^{j2\pi(n-n')p/N}. \tag{9}$$

Analysis of Eq. 9 shows that A is constant with respect to r. Further, we observe that the summation part in Eq. 8 is the $r^{th}$ coefficient of the Fourier transform of the multi-path power delay profile. Normally, L<<N, so that that $\rho(r)$ varies slowly with respect to r. In fact, as shown below for d<<N, we have the following approximation $$I_{p,k+d} = I_{p,k} \tag{10}$$

Consider first that $I_{(m+d)-(k+d), k+d}$ is written as $$I_{(m+d)-(k+d),k+d} = \sum_{l=0}^{L-1} G_{m-k,l} e^{-j2\pi(n+d)l/N} \quad (10A)$$

$$= \sum_{l=0}^{L-1} G_{m-k,l} e^{-j2\pi ml/N} e^{-j2\pi dl/N}$$

and that for $L \ll N$, we approximate $2\pi dl/N \approx 0$ when $d \ll N$. Therefore $e^{-j2\pi dl/N} \approx 1$. Then, above $I_{(m+d)-(k+d), k+d}$ is written as $$I_{(m+d)-(k+d),k+d} \approx \sum_{l=0}^{L-1} G_{m-k,l} e^{-j2\pi ml/N} = I_{m-k,k} \quad (10B)$$

The autocorrelation of ICI, $\rho(r)$, as will be shown hereinbelow is exploited to obtain an ICI gain estimate. Further, the variation of ICI gain $I_{p;\,k}$ with respect to k depends on the multi-path delay profile.

If the channel impulse response in the $k^{th}$ sub-carrier is approximated by a linear equation as, $$H_k(n) = H_k(0) + H_k' \cdot \left(n - \frac{N-1}{2}\right) + \varepsilon_{ap} \quad (11)$$

$$\approx H_k(0) + H_k' \cdot \left(n - \frac{N-1}{2}\right)$$

the ICI coefficients are calculated as, $$I_{d,k} = \frac{1}{N} \sum_{n=0}^{N-1} H_k(n) \cdot e^{-j2\pi dn/N} \quad (12)$$

Taking Eq. (11) into Eq. (12), we have, $$I_{d,k} = -\frac{H_k^T}{N(1 - e^{-j2\pi d/N})} + \varepsilon_d$$

Following this linear approximation, it is shown that, $$\frac{I_{a,k}}{I_{b,k}} \approx \frac{1 - e^{-j2\pi b/N}}{1 - e^{-j2\pi a/N}} = \frac{e^{-j\pi(b-a)/N} \sin(b\pi/N)}{\sin(a\pi/N)} \quad (13)$$

which is independent of the subcarrier index, k.

Therefore, when the linear approximation is made, the OFDM receiver to estimates only one vector of the ICI coefficients, $H_1(k)$. The other ICI coefficient vectors for different d values can be derived based on the linear relationship shown in Eq. (13).

There has been significant research on improving the accuracy of the channel gain estimation to improve the error performance in OFDM systems. However, in fast fading channels, the Doppler induced ICI from neighboring sub-carriers results in an error that is addressed in an embodiment according to the invention hereinbelow. Therefore, both channel gain and ICI gain are accurately estimated at the receiver in order to perform ICI cancellation.

A schematic diagram of the iterative decision-aided channel estimation and ICI cancellation for mobile OFDM systems according to an embodiment of the invention is illustrated in FIG. 1. At a first iteration, pilot-aided channel estimation 110 is applied to the received signal in order to obtain a first estimate of the channel gain $H_k$ at each sub-carrier. The frequency domain channel gains at the pilot sub-carriers are transformed into a spectrum domain, which is then filtered with a filtering function, to provide a filtered spectrum. The filtered spectrum is then interpolated and transformed back into the frequency domain to obtain channel gain estimates of each sub-carrier. A tentative decision of the transmitted symbol $X_k$ is thus obtained from process 120. In the second and further iterations, the decisions from at least a previous iteration are used to obtain a better estimate in process 140 for both channel gain and ICI gains at each sub-carrier.

Figure 2:
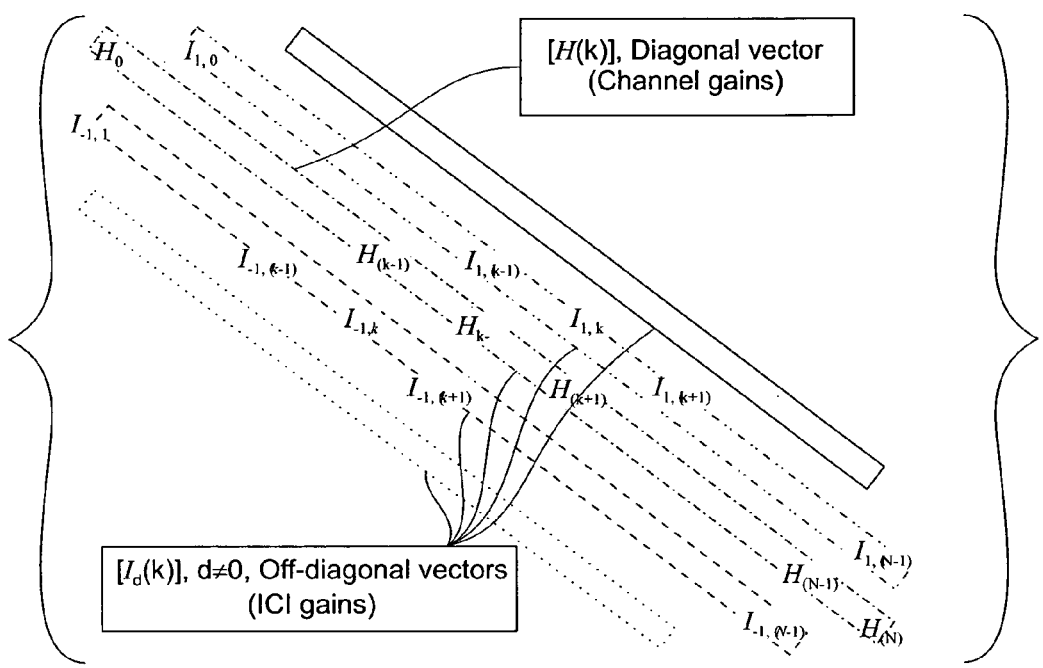
FIG. 2 illustrates a channel frequency response matrix.

In the process 140 channel gains at each sub-carrier corresponding to the diagonal vector of the channel frequency response matrix, shown in FIG. 2, and ICI gains corresponding to off-diagonal vectors of the channel frequency response matrix are estimated in dependence upon results of the previous iteration and the received signals.

The frequency domain channel gains at each sub-carrier are estimated. The estimated channel gains are then transformed into spectrum domain, which is then filtered with a filtering function to provide a filtered spectrum. The filtered spectrum is then transformed back into frequency domain to obtain the channel gain estimates of each sub-carrier.

The frequency domain ICI gains from the $d^{th}$ neighbor sub-carrier at each sub-carrier are estimated. The resulting ICI gain estimates are transformed into spectrum domain, which is then filtered with a filtering function to provide a filtered spectrum. The filtered spectrum is then transformed back to frequency domain to obtain channel gain estimates of each sub-carrier.

The frequency domain ICI gains from the $d^{th}$ neighbor sub-carrier at each sub-carrier are estimated from the total ICI components, which is the received signals subtracted by the channel gain attenuated transmitted signals and the decision from the previous iteration.

The frequency domain ICI gains from the dth neighbor sub-carrier at each sub-carrier are estimated from the residual ICI components, which is the received signals subtracted by the sum of the channel gain attenuated transmitted signals and the other ICI component calculated from the ICI gain estimates and the decisions from the previous iterations.

To reduce complexity in the ICI gains estimation, ICI gains from the $1^{st}$ neighbor sub-carrier at each sub-carrier are estimated according to an embodiment of the invention. The remaining ICI gains are obtained by scaling the estimated ICI gains with a predetermined scaling factor.

As a result the receiver performs equalization and ICI cancellation in an iterative fashion to improve the error performance.

Figure 3A:
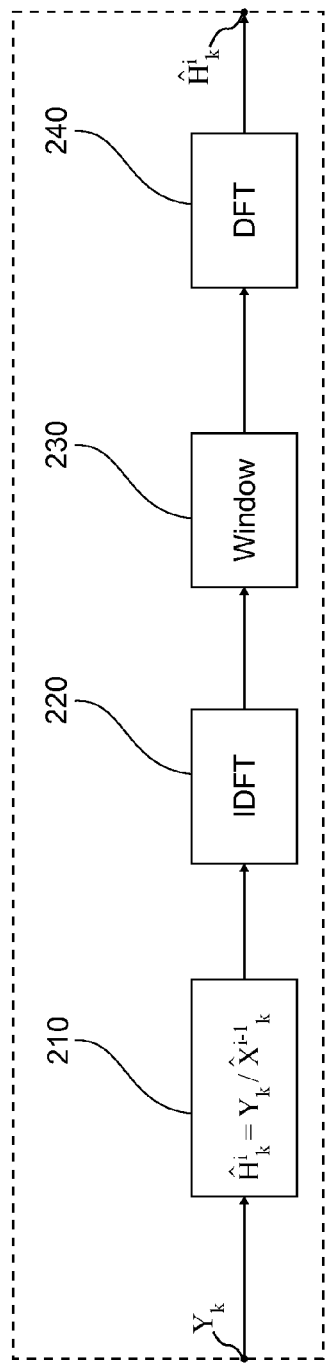
FIG. 3A illustrates a prior art channel frequency response estimation employing IDFT filtering.

In the second and further receiver iterations, decisions made in the previous iteration are exploited to aid the channel estimation. A simple and effective technique to improve the accuracy of the channel gain estimation with decision feedback was disclosed in Fukuhara et al, and is illustrated in FIG. 3A as estimation process 2100. This technique applies a pair of IDFT/DFT operations 220 and 240, respectively, in conjunction with windowing 230 to filter out partial noise and ICI. This method is called IDFT-filtering where the time domain Channel Impulse Response (CIR) is estimated by applying an IDFT to the Least Square (LS) estimate 210 of the channel gain, which is given by $$\tilde{H}_k^i = Y_k / \hat{X}_k^{i-1}, \quad (14)$$

where the superscript i is the iteration index. Let $s_m$ denote the IDFT 220 of the sequence $\tilde{H}_k^i$. If there is no noise and no ICI, the CIR is reconstructed perfectly. In this case, $h_{0,i}=h_l$, $\tilde{H}_k^i=H_k$, we have $$s_m = h_m \quad (15).$$

However, when using the noisy LS estimates of the channel gain $\tilde{H}_k^i$ to estimate the CIR, the noise and the ICI not only cause error on the L-path CIR estimation, they also induce "multi-paths" with "delays" greater than the channel delay spread. A simple window function W is applied to remove these extra "multi-paths". W is written as $$W_k = \begin{cases} 1, & 0 \le k \le N_w \\ 0, & \text{otherwise.} \end{cases} \quad (16).$$

Since in practice, the guard interval Ng is set to be greater than the delay spread of the CIR to avoid ISI, $Ng \ge L$, we use $Nw=Ng$ as the window size. To obtain improved channel gain estimation, the estimate of the length of the multi-path delay spread $\hat{L}$ is used as the window size with a resulting tradeoff in complexity of calculations. Techniques to detect the length of multi-path delay spread and techniques for CIR estimation exploiting frequency domain pilots are known in the art.

Figure 3B:
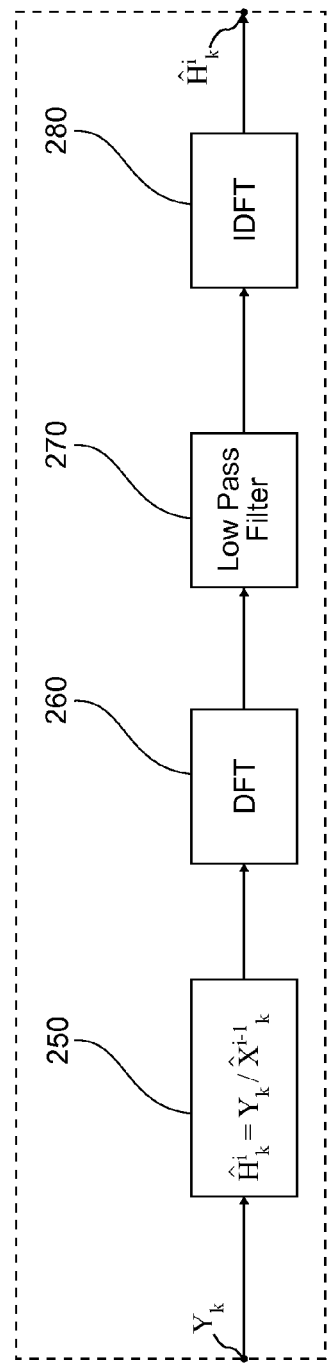
FIG. 3B illustrates channel frequency response estimation employing DFT filtering which is an equivalent representation of IDFT filtering.

FIG. 3B illustrates an equivalent process to IDFT-filtering, where the order of IDFT/DFT is swapped and the windowing function is modified accordingly. This method is referred to as DFT-filtering.

The cutoff frequency $N_v$ of the low-pass filter V 270 is dynamically calculated, such that the ratio of the power in the pass band to the total power exceeds a predefined threshold. The low-pass filter V 270 is then realized, simply by setting to zero the components at frequencies higher than the cutoff frequency of the low-pass filter V 270 in the transform domain. The low-pass filter V 270 is written as $$V_k = \begin{cases} 1, & 0 \le k \le N_v; N - N_v \le k \le N - 1 \\ 0, & \text{otherwise.} \end{cases} \quad (17).$$

The cutoff frequency $N_v$ in the DFT-filtering is determined by the channel multi-path spread. Let $S'_m$ denote the DFT 260 of the sequence $\tilde{H}_k^i$. Hence, assuming no noise and ICI, we have $$S'_m = \sum_{k=0}^{N-1} H_k e^{-j2\pi km/N} \quad (18).$$

$$= \sum_{l=0}^{L-1} h_l \sum_{k=0}^{N-1} e^{-j2\pi k(m+l)/N}.$$

The last summation in Eq. 18 is nonzero only when m+l=0 or m+l=N. Thus we have $S'_0=h_0$ and for l>0, we have $$S'_{N-l} = h_l \quad (19).$$

The DFT-filtering method presented in channel gain estimation process 2200 is equivalent to the estimation process 2100 of the IDFT-filtering method if the window functions satisfy the following relationship:

$$V_0 = W_0; V_k = W_{N-k}, k \ne 0 \quad (20).$$

Based upon this either the guard interval or the estimated multi-path spread is used to determine the cutoff frequency Nv as discussed above for the IDFT-filtering method, that $Nv=Ng-1$ or $Nv=L-1$. The low-pass filter V 270 is now written as $$V_k = \begin{cases} 1, & k=0, N-N_v \le k \le N-1 \\ 0, & \text{otherwise.} \end{cases} \quad (21).$$

Compared to other prior art channel gain estimation processes, the channel gain estimation process 2200 provides several advantages including, robustness and low complexity. With respect to robustness, in the process 2200 no assumptions are made regarding the channel statistics during the estimation process. Reduced complexity is achieved as the DFT 260 and IFDT 270 processes are implemented with simpler FFT/IFFT processes respectively.

In order to cancel the ICI from a received signal, it is necessary to estimate the ICI gains. This is accomplished, optionally, using decision feedback. Unlike the channel gain estimation, where the signal component is usually substantially stronger than the noise and the ICI, each individual ICI component is concealed within a relatively higher level of noise, which is a composite of Additive White Gaussian Noise (AWGN) and residual ICI. It is therefore a step in the process to extract the ICI gain. Assuming perfect channel gain estimation and correct decision feedback, the ICI gain $I_{m-k;\,k}$ in the ICI contributed from the mth sub-carrier onto the kth sub-carrier is written as $$I_{m-k,k} = \left(Y_k - H_k X_k - \sum_{n=0, n \ne k, m}^{N-1} I_{n-k,k} X_n - Z_k\right) / X_m \quad (22).$$

$$= (Y_k - H_k X_k)/X_m - \left(\sum_{n=0, n \ne k, m}^{N-1} I_{n-k,k} X_n - Z_k\right)/X_m.$$

If the last term in the Right-Hand Side (RHS) of the last equality is treated as noise, then we obtain the LS estimate of $I_{m-k;\,k}$ in the ith iteration as $$\tilde{I}_{m-k,k}^i = (Y_k - \hat{H}_k^i \hat{X}_k^{i-1}) / \hat{X}_m^{i-1}. \quad (23).$$

Here the decisions from the iteration i−1 are used, while the channel gain estimates are from the current iteration i. Even with perfect channel gain estimation and correct decision feedback, $\sim I_{m-k;\,k}$ is still a very approximate estimation due to the rest of the ICI components and AWGN.

However, in the $3^{rd}$ and further iteration, ICI gains and decisions estimated in the previous iteration can be exploited to remove part of the ICI components from the composite noise using the following equation therefore the ICI gain estimation can be improved.

$$\hat{I}_{k+d,k} \approx \frac{\left(y_k - \hat{H}_k^{(i-1)} \cdot \hat{x}_k^{(i-1)} - \sum_{a=-K, a \ne 0, d}^{K} \hat{I}_{k+a,k}^{(i-1)} \cdot \hat{x}_{k+a}\right)}{\hat{x}_{k+d}^{(i-1)}}$$

From the ICI analysis in previous section, we know that the variation of $I_{m-k;\,k}$ with respect to k is slow when L<<N, while the AWGN and the summation of residual ICI vary rapidly. Therefore, they are separable with the help of the DFT-filtering using an appropriate low pass filter, such as low pass filter V 270 of FIG. 3B. Moreover, it is shown in Eq. 4, that $I_{m-k;\,k}$ is the mth coefficient of the Fourier transform of the sequence $G_{m-k; l}$, which only has L nonzero terms. Therefore, the same low pass filter V 270 as used in the decision-aided channel gain estimation is optionally used in the ICI gain estimation.

As noted above, the first iteration provides only the channel gain estimates at the receiver, such that a simple one-tap equalizer is optionally used to estimate the tentative decisions. The decision statistics at the kth sub-carrier are written as $$R_k^1 = (\hat{H}_k^1)^\dagger Y_k \quad (24)$$

where † indicates complex conjugate. Optionally, other methods such as Minimum Mean-Square Error (MMSE) with more taps is applied to obtain more accurate tentative decisions with a tradeoff in complexity.

In the ith iteration, i, 2, after estimating both channel gain and ICI gains, a simple receiver cancels the ICI at the kth sub-carrier and forms the decision statistics as $$R_k^i = (\hat{H}_k^i)^\dagger \left( Y_k - \sum_{m=0, m \neq k}^{N-1} \hat{F}_{k,m}^i \hat{X}_m^{i-1} \right). \quad (25)$$

We call such a receiver a one-tap equalizer with ICI cancellation. A better receiver exploits the fact that the signal $X_k$ not only appears at the kth sub-carrier, it also appears at the other sub-carriers as interference. The decision statistics for the kth sub-carrier with joint consideration of all sub-carriers becomes $$R_k^i = (\hat{F}(:,k)^i)^\dagger \left( Y - \sum_{m=0, m \neq k}^{N-1} \hat{F}(:,m)^i \hat{X}_m^{i-1} \right), \quad (26)$$

where $\hat{F}(:,k)^i$ denotes the kth column of $\hat{F}^i$. Such a receiver exploits time diversity due to time domain channel variation. Therefore, it provides better performance than one-tap equalization with ICI cancellation.

It is has been shown that most of the total ICI power concentrates only in a few neighboring sub-carriers. Therefore, to facilitate the tradeoff between performance and complexity, we estimate only the ICI gains from 2K neighboring sub-carriers, K sub-carriers at each side. Thus, the channel matrix F has nonzero elements in the 2K+1 diagonals, the lower triangle of the K×K matrix in the bottom-left corner, and the upper triangle of the K×K matrix in the top-right corner. For each sub-carrier, (2K+1) received signals are used to jointly perform (2K+1)-tap equalization and ICI cancellation in the data detection. Therefore, we call such a receiver a (2K+1)-tap equalizer with ICI cancellation.

The iteration is stopped, for example, after a predetermined number of iterations or the number of iterations is dynamically adjusted according to the environment of the receiver with respect to SNR, mobility of receivers, number of channels, BER, and cost of processing on battery lifetime, but not limited thereto.

Computer simulations to determine the performance provided by the iterative channel estimation and ICI cancellation process according to embodiments of the invention are presented in respect of FIGS. 4 to 8. The simulated OFDM system has N=1024 sub-carriers, with BPSK modulation. The power of the multi-path channel taps is [0; −2; −6; −8; −10] (dB), and the delays are [0; 1; 3; 5; 10] (OFDM samples). Each channel tap is generated with Jakes' Doppler spectrum. Equal space pilots are used, and the spacing between two adjacent pilots is 16 subcarriers.

Figure 4:
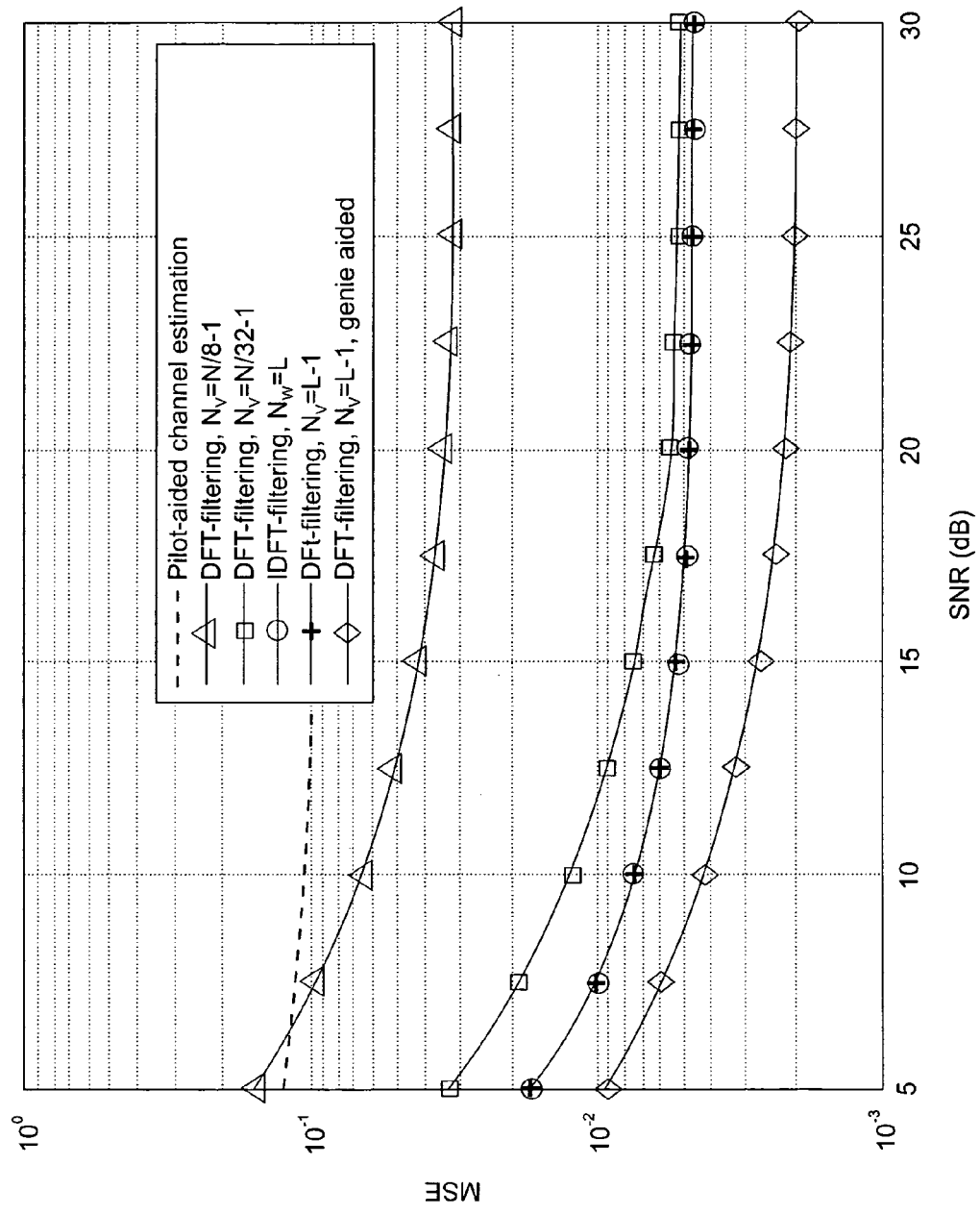
FIG. 4 illustrates the effect of window size in DFT/IDFT filtering on channel gain estimation according to an embodiment of the invention.

In FIG. 4, the Mean Square Error (MSE) of the estimated channel gain is plotted illustrating the effectiveness of the iterative decision-aided channel gain estimation process according to embodiments of the invention. For the first iteration pilot-aided channel gain estimation is based upon a state of the art process. For the next iteration of the decision-aided channel gain estimation, both DFT-filtering and IDFT-filtering methods provide the same performance if their window sizes follow the relation outlined in Eq. 20. Referring to FIG. 4 the significance of choosing the window size in DFT-filtering/IDFT-filtering. The optimal performance is achieved when using the maximum multi-path delay L as the window size. The performance suffers when a larger window size is used. For comparison, the performance of channel gain estimation with genie feedback is plotted.

Figure 5:
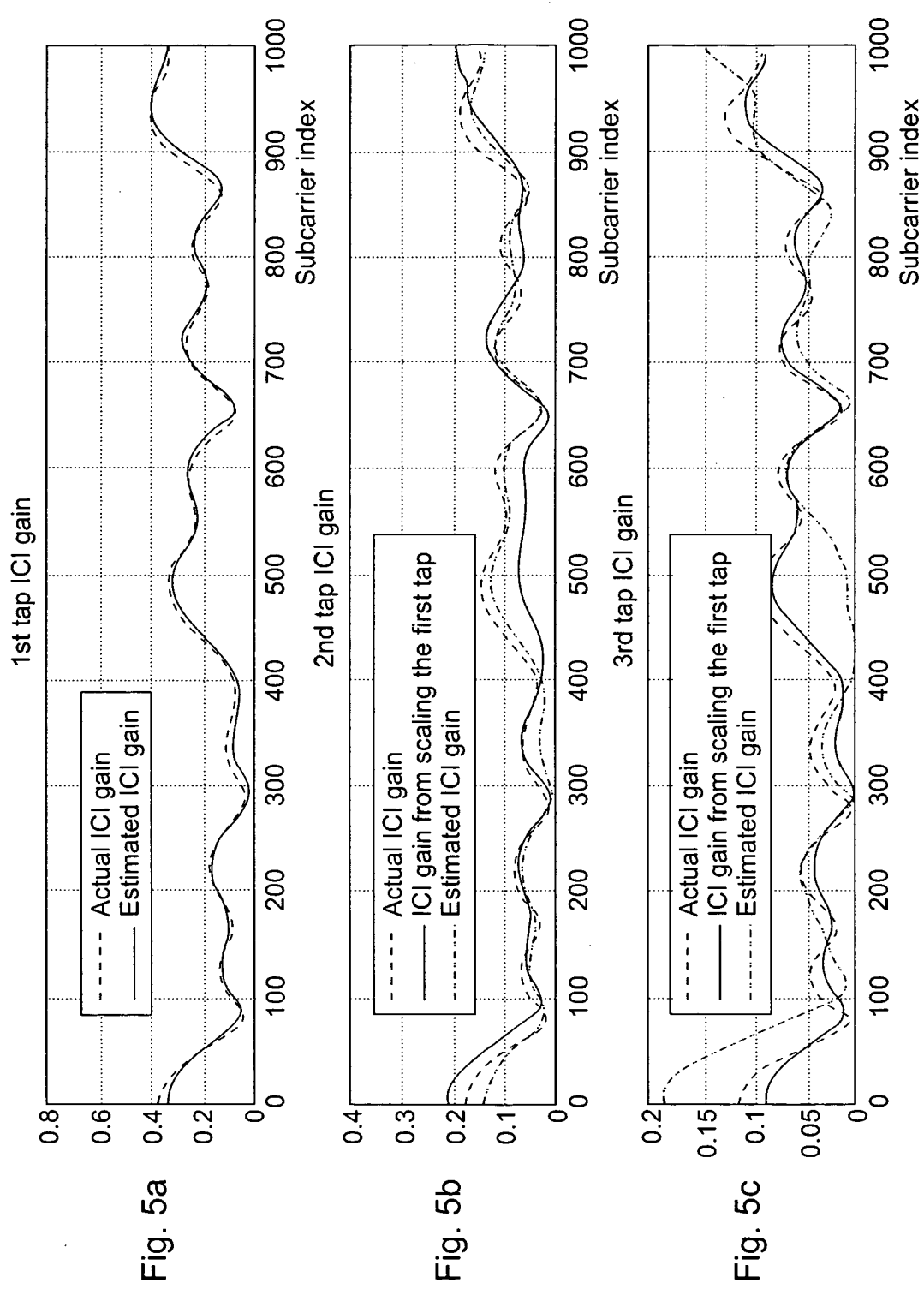
FIG. 5A illustrates a snapshot of the ICI gain vector estimation for the first tap ICI gain vector corresponding to the $1^{st}$ off-diagonal vector according to an embodiment of the invention.
FIG. 5B illustrates a snapshot of the ICI gain vector estimation for the second tap ICI gain vector corresponding to the 2nd off-diagonal vector according to an embodiment of the invention.
FIG. 5C illustrates a snapshot of the ICI gain vector estimation for the third tap ICI gain vector corresponding to the 3rd off-diagonal vector according to an embodiment of the invention.
Figure 6:
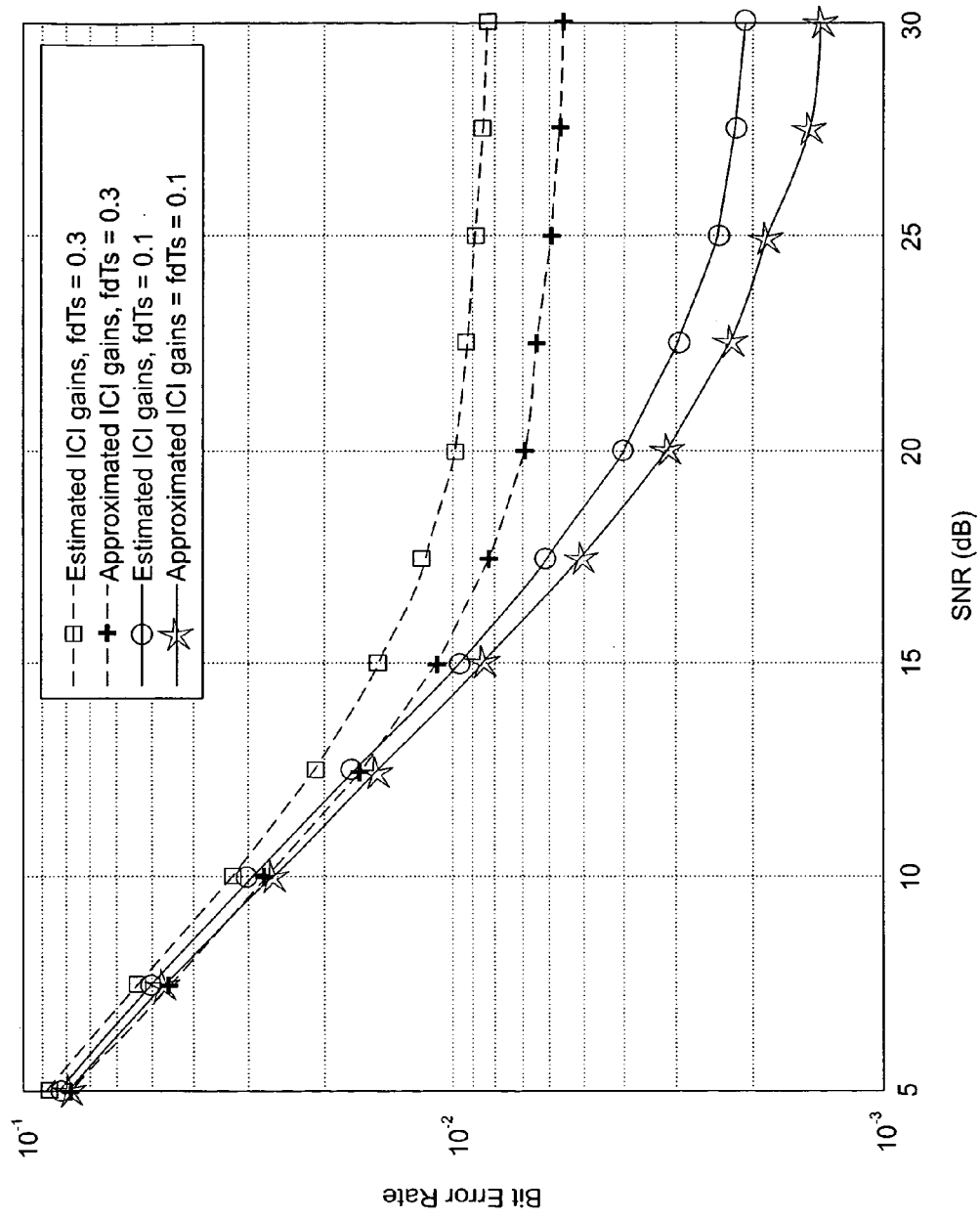
FIG. 6 illustrates exemplary an error performance comparison between estimated ICI gains and approximated ICI gains according to an embodiment of the invention.

A snapshot of the ICI gains estimation is illustrated in FIG. 5, where the amplitude of 3 different taps ($l_1$; $l_2$; and $l_3$;) of estimated and approximated ICI gains are plotted with comparison to the actual ICI gains. The bit-error rate comparison between estimated ICI gain and approximated ICI gain is plotted in FIG. 6. The approximated ICI gains using the estimated first tap ICI gain are closer to the actual ICI gains than the estimated ICI gains. This is due to the fact that, for taps p>1, the LS estimates of the ICI gain are substantially noisier and, therefore, less accurate than the first tap ICI gain. In the simulations, $f_d T_s$=0:1 and 0:3 are considered. It is shown that significant improvement is obtained by using the approximated ICI gains that yield good Bit-Error Rate (BER) performance even for relatively rapid fading.

The fact that the ICI gains at tap p>1 are obtained more accurately by approximation from the first tap ICI gain suggest that we can reduce the receiver complexity in ICI gain estimation. We only need to estimate one tap of ICI gain instead of 2K taps.

Figure 7:
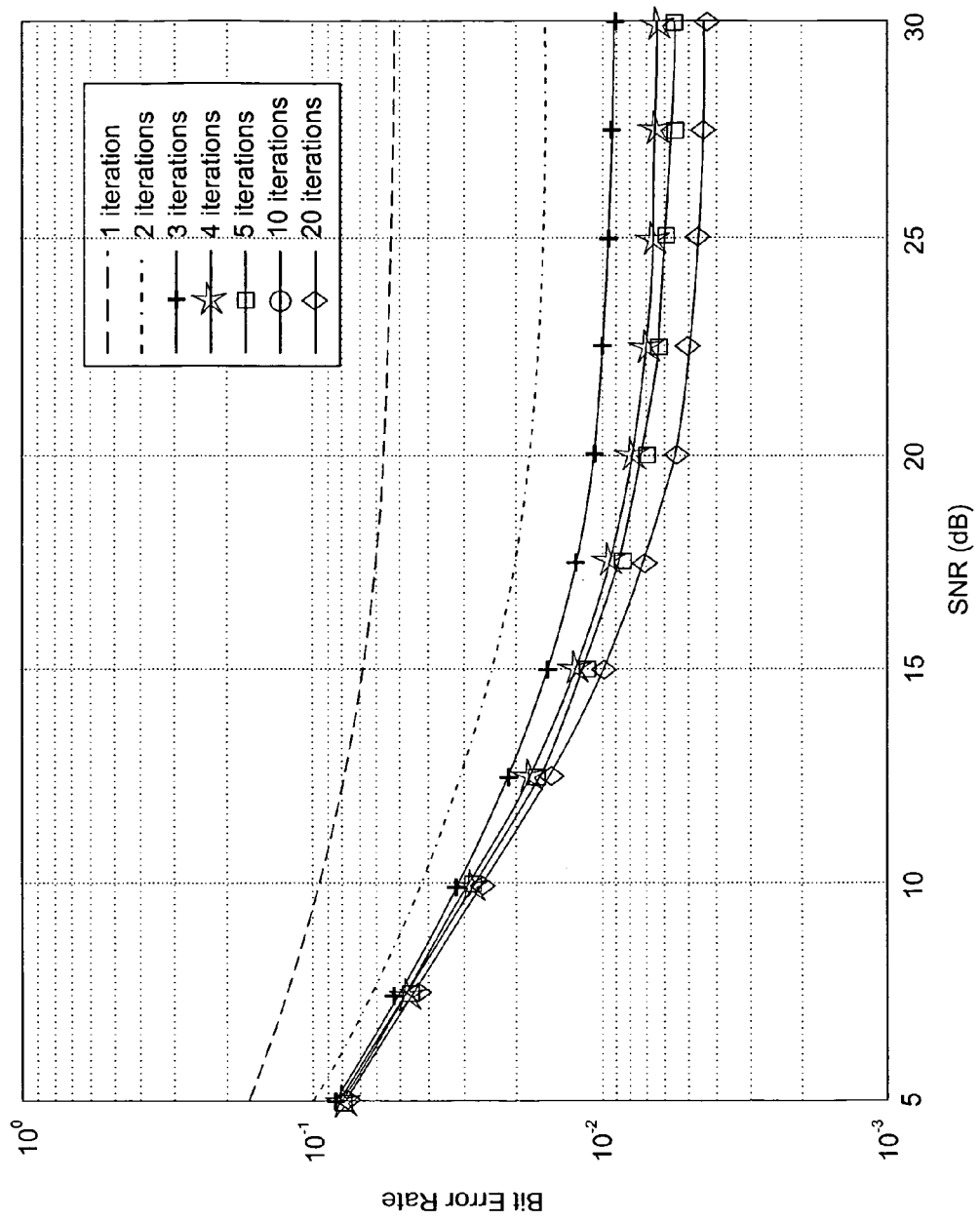
FIG. 7 illustrates exemplary performance of the proposed ICI cancellation approach with variations in the number of iterations.
Figure 8:
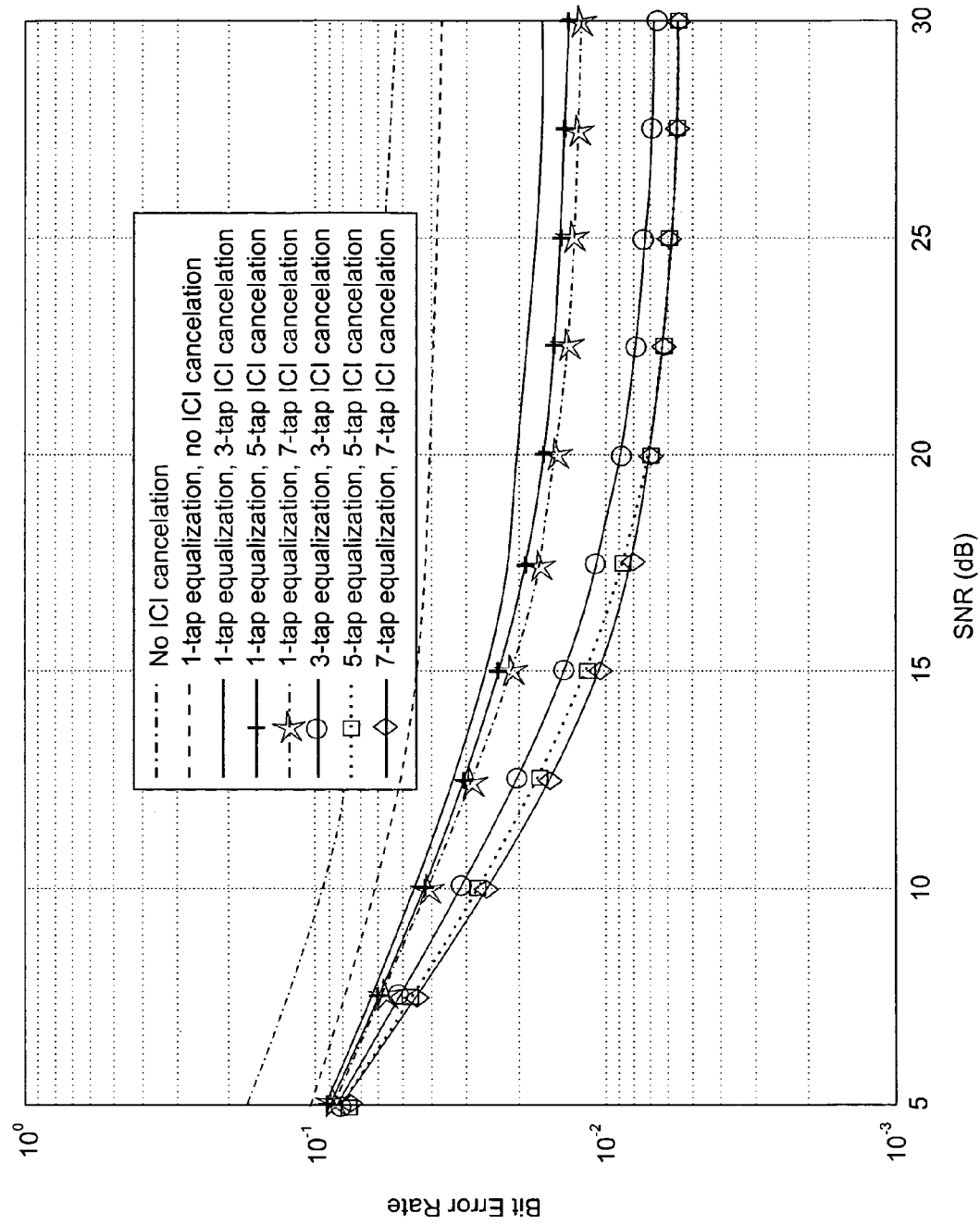
FIG. 8 illustrates exemplary performance of the proposed ICI cancellation approach with different number of taps.

Referring to FIG. 7, the BER performance improvement is shown, plotted against the number of iterations of the channel estimation and ICI cancellation process according to an embodiment of the invention. As with the previous FIGS. 5 and 6, approximated ICI gains were used in the simulations for simplicity. From FIG. 6 it is evident that as the number of iterations increases, the extra performance gains diminish. In obtaining a good tradeoff between complexity of the process and the performance improvements, FIG. 6 indicates that establishing the process to perform 4 or 5 iterations provides a good balance. Optionally, the process is established to operate with a fixed number of iterations or the number of iterations is dynamically adjusted according to the environment of the receiver with respect to SNR, mobility of receivers, number of channels, BER, and cost of processing on battery lifetime, but not limited thereto.

In addition to the number of iterations performed the invention allows for a second degree of tradeoff between complexity and performance by varying the number of approximated ICI gain taps as well as the number of equalization taps. The performance improvements in BER for a receiver with varying ICI gain taps and equalization taps is plotted in FIG. 8 as a function of SNR. According to the simulation environment employed in determining the improvements plotted in FIG. 8, implementing the process with a 5-tap equalization and 5-tap ICI cancellation provides a good tradeoff between performance and complexity. While the process is optionally implemented with a predetermined number of taps, such as the 5 identified above, it is also possible to implement the process with different predetermined numbers according to the environment and tradeoff of complexity/performance acceptable for the receiver. Also, optionally, the number of taps is varied according to the environment and received signal in a dynamic manner.

Based on the facts that the variation of channel gain and each tap of ICI gain along the sub-carrier index is much slower than the composite noise, embodiments of the invention provide a novel iterative channel estimation and ICI cancellation for OFDM systems, particularly mobile ones. According to embodiments according to the invention the process approximates the ICI gains $I_p$: at taps p>1 using the estimated first tap ICI gain. The approach reduces the computation complexity and provides significant improvement in error performance. Compared to prior art channel estimation processes for OFDM system, the channel estimation process according to embodiments of the invention does not rely on the channel statistics, and thus, provides robust performance in a wide range of fading conditions. The iterative decision-aided channel estimation process provides an effective solution to OFDM systems with only frequency-domain pilots. For OFDM systems with time-domain pilot symbols, the iterative decision-aided channel estimation process is also applicable to track the channel variation between the pilots, allowing relaxing the requirements for pilot repetition.

In most practical OFDM systems, although the OFDM modulation is performed with an IFFT assuming the number of subcarriers being a power of 2, there are usually null sub-carriers on both sides of the active spectrum to reduce the interference between services carried in adjacent channels. The existence of the null sub-carriers introduces the so called "edge effect" when channel estimation is performed using DFT/IDFT interpolation with filtering in case of pilot-aided solution or using DFT/IDFT filtering in case of decision-aided solution, where the channel estimation on the subcarriers close to the active spectrum edges suffers higher estimation error.

In an OFDM system, the active frequency spectrum is divided into a group of K narrowband subchannels with equal bandwidth. When the number of subchannels is sufficiently large, each subchannel is modeled as a flat-fading channel. The information data sequence is also divided into K low-rate data sequences, each being carried in one subchannel. After the insertion of (N−K) null subcarriers (where N is a power of 2) next to the K active subcarriers, the OFDM modulation is performed efficiently with an N-point IFFT. A Cyclic Prefix (CP) is added to the time-domain OFDM symbol in order to remove the ISI and the ICI caused by multipath fading channels. When the length of the CP is longer than the multipath channel delay spread, the wideband OFDM signal transmitted over a frequency-selective fading channel is equivalent to K narrowband subcarriers each transmitted of over a flat fading channel.

Figure 9:
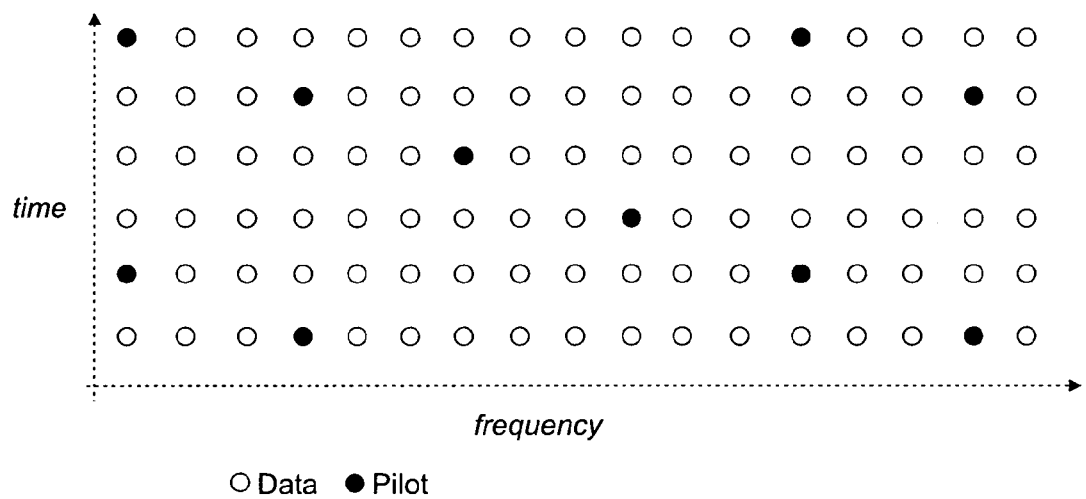
FIG. 9 illustrates an OFDM time frequency signal structure.

The frequency domain signal of a DVB-T/H/SH system is plotted in FIG. 9, where the filled circles are pilot symbols and the hollow circles are data symbols. The pilots are inserted evenly into the frequency-domain every 12 subcarriers. The pilot positions are shifted by 3 subcarriers from one OFDM symbol to the next. In the 2 k mode of the DVT-T/H/SH system, there are a total of 1705 active subcarriers, which carry either data symbols or pilot symbols. The OFDM modulation is performed with a 2048-point IFFT, after the insertion of 343 null subcarriers next to the 1705 active subcarriers.

The pilot symbols are used for both synchronization and channel estimation. In order to obtain good channel estimation, the pilot symbols are transmitted with a boosted power level in the DVB-T/H/SH system, so that the interference leaked from adjacent data subcarriers into the pilot subcarriers has less impact.

An OFDM data and pilot symbol structure similar to that of the DVB-T/H/SH system in the 2 k mode is assumed and the parameters shown in Table 1 are used.

TABLE 1

| Parameters | Active subcarriers K | FFT-points N | # of scattered pilots M | Pilot spacing L |
|---|---|---|---|---|
| Value | 0~1704 | 2048 | 143 | 12 |

DFT/IDFT-interpolation with filtering is an efficient technique to perform the channel estimation for OFDM systems with in-band pilot symbols. DFT-interpolation is based on the fact that the number of time-domain parameters—number of delay taps—necessary to characterize the channel is much less than the number of frequency-domain parameters, i.e., the number of subcarriers in an OFDM system. Therefore, the receiver estimates the time-domain parameters and derives the frequency domain parameters from the time-domain parameter estimations.

In most cases, the delay spread of the channel response is substantially smaller than the number of pilots. By applying a discrete transform to the frequency-domain pilots to bring these into the cepstrum domain, and then applying a Low-Pass Filter (LPF) to the cepstrum representation, the channel estimation accuracy is greatly improved since the channel frequency response mainly contains "low frequency component" in the cepstrum domain. On the other hand, the estimation error caused by the AWGN noise, the ICI and other wideband interference has a flat response in the cepstrum domain. Applying a LPF in the cepstrum domain therefore removes a significant part of the noise and interference from the channel estimation on the pilots. Applying an ideal LPF in the cepstrum domain is equivalent to applying a window. Therefore, this technique is referred to as DFT-Interpolation with Filtering (DFT-Int-Fil) hereinbelow.

In an OFDM modulator, a vector of K symbols is mapped onto K subcarriers. Among these, M symbols are pilots known at the receiver, with which the frequency channel estimations of all the subcarriers are derived. The M pilot carriers are evenly distributed over the entire signal bandwidth, with a ratio of L=K/M=12 in the DVB-T/H/SH 2 k mode systems.

The receiver calculates a first channel estimation on the pilot subcarriers as, $$\tilde{H}_P(k) = \frac{r_P(k)}{x_P(k)} = \frac{x_P(k)H_P(k) + n_P(k)}{x_P(k)} \qquad (27)$$
$$= H_P(k) + \varepsilon(k)$$

which are called the LS estimates, where $\varepsilon(k)$ is the channel estimation error caused by AWGN noise and other additive interferences, such as the ICI for fast fading channels, $x_P(k)$ and $r_P(k)$ are respectively the $k^{th}$ transmitted and received pilots.

The channel responses of other subcarriers are estimated via interpolation from the LS channel estimates. For simplicity, only one-dimensional (1D) interpolation over the frequency-domain is considered. Various interpolation techniques exist to achieve this goal, where the DFT/IDFT interpolation has been shown to be simple and effective.

The LS channel estimates are first converted into the cepstrum domain using an M-point DFT, $$\tilde{G}_P(m) = DFT_M\{\tilde{H}_P(k)\} \qquad (28)$$
$$= DFT_M\{H_P(k)\} + DFT_M\{\varepsilon(k)\}$$

In most practical cases, the channel delay spread is substantially smaller than the number of pilot carriers. Therefore, the energy of the cepstrum representation of $\tilde{H}_P(k)$ concentrates in the lower band. On the other hand, the transform of the noise and interference components is flat in the cepstrum domain. A LPF can therefore be applied to $\tilde{G}_P(m)$ to remove part of the interference while keeping most of the useful information. In cases where the channel impulse response is much shorter than M, the performance improvement could be significant since the majority of the interference is removed. The LPF is applied by a rectangular window as, $$\tilde{G}_{WP}(m) = \begin{cases} \tilde{G}_P(m), & 0 \le m \le \frac{W}{2} - 1 \text{ or } M - \frac{W}{2} \le m \le M - 1 \\ 0, & \text{else} \end{cases} \qquad (29)$$

The interpolation is then performed by padding K−M zeros to $\tilde{G}_{WP}(m)$ and by applying a K-point IDFT to the zero-padded version $\tilde{G}_{WP\text{-}INTP}(m)$ of $\tilde{G}_{WP}(m)$, $$\check{H}(k) = IDFT_K\{\tilde{G}_{WP\text{-}INTP}(m)\} \qquad (30)$$

where $$\tilde{G}_{WP\text{-}INTP}(m) = \qquad (31)$$
$$\left[\tilde{G}_{WP}(0) \dots \tilde{G}_{WP}\left(\frac{M}{2}-1\right) 0\ 0\ \dots\ 0\ 0\ \tilde{G}_{WP}\left(\frac{M}{2}\right) \dots (M-1)\right]_K$$

In practical OFDM systems such as the DVB family, K and M are usually not a power of 2. In those systems, the OFDM modulation is performed by padding N−K null subcarriers in addition to the K active subcarriers, to be able to apply the more efficient N-point IFFT/FFT.

The DFT-based interpolation solution provides accurate results only when the channel frequency response is periodical and when it is continuous between the period boundaries. However, this is not the case in practice, where most OFDM systems have null subcarriers on the side of the useful spectrum. There are no pilots among the null subcarriers. When the channel estimation is performed over the entire spectrum—including both active and null subcarriers—to apply an FFT instead of a DFT, this results in large estimation errors on the subcarriers close to the boundaries between the active and the null subcarriers because of the Gibbs's phenomenon, which is referred to as the "edge effect" hereinbelow.

DFT interpolation is optimal when the number of total subcarriers is divisible by the pilot spacing. Performance degradation occurs for the FFT-interpolation-based channel estimation when the pilots are not strictly evenly-distributed in the whole spectrum. In the case of the DVB-T/H/SH systems, the pilot spacing is 12 subcarriers, which is not a power of 2. Therefore, it is impossible to have strictly evenly-distributed pilots. Simulation results show that this causes higher channel estimation MSE compared to a DFT-based interpolation. Therefore, an alternative solution is needed which has both a performance close to the DFT-based interpolation and an implementation complexity close to the FFT-based solution.

The edge effect of the DFT-interpolation-based channel estimation is caused mainly by the discontinuities on the two boundaries. In the state of the art, a Wiener filter is used to add more virtual pilots in the null area of the spectrum. However, applying the Wiener filter requires the knowledge of the channel characteristics. This issue is addressed by performing channel estimation which optimizes the MSE of the active subchannels only. This is achieved by applying a matrix multiplication, which requires more complexity. Alternatively, the edge effect is mitigated by transmitting extra pilot symbols near the edges of the active spectrum in addition to the regularly spaced pilots, thereby increasing pilot density at the edges. Then, an efficient MMSE channel estimator is applied to achieve better channel estimation performance. This technique, however, requires the transmission of additional pilots and requires also additional complexity in both the MMSE channel estimation and in estimating the second-order channel characteristics which are required by the MMSE channel estimator.

In an embodiment according to the invention Virtual Pilots (VPs)—and corresponding virtual channel gain estimates—are added in the null spectrum to reduce the discontinuity on the two boundaries between the active and the null spectrum. The VPs are added in such a manner that the channel frequency response over the expanded spectrum is smooth on the two boundaries between the active spectrum and the null spectrum. In an optimal solution the spectrum is circularly continuous after the VPs are added. However, this is not easily achievable. According to an embodiment of the invention a less optimal but simpler method is implemented in order to minimize the complexity.

With the assumed DVB-T/H/SH 2 k mode system, there are 343 null subcarriers at the end of the active spectrum. When there are multiple such OFDM services occupying adjacent channels, this is equivalent to a system having about 171 null subcarriers on each side. With the pilot spacing of 12 subcarriers, there are 14 pilots missing in the null spectrum on each side of the active spectrum. Therefore, an expanded LS CEV is generated by adding 14 VPs on each side of the original LS CEV.

Assuming perfect synchronization, for a received OFDM symbol, the receiver first obtains the LS channel estimates on the pilot carriers with Eq. (27), resulting in the LS CEV $\tilde{H}_P$. The LS CEV, which contains MLS channel estimates on the active pilots, is extended into a Pseudo CEV (PCEV) vector of length $M_e$, as, $$\tilde{H}_P^e = [\bar{a}_1\ \tilde{H}_P\ \bar{a}_2] \qquad (32)$$

where $\bar{a}_1$ and $\bar{a}_2$ are the two VP vectors of length $L_1$ and $L_2$ respectively on the left and right side of the active spectrum, and $M_e = L_1 + M + L_2$. The PCEV is thereafter used for DFT-interpolation-based channel estimation.

Figure 10:
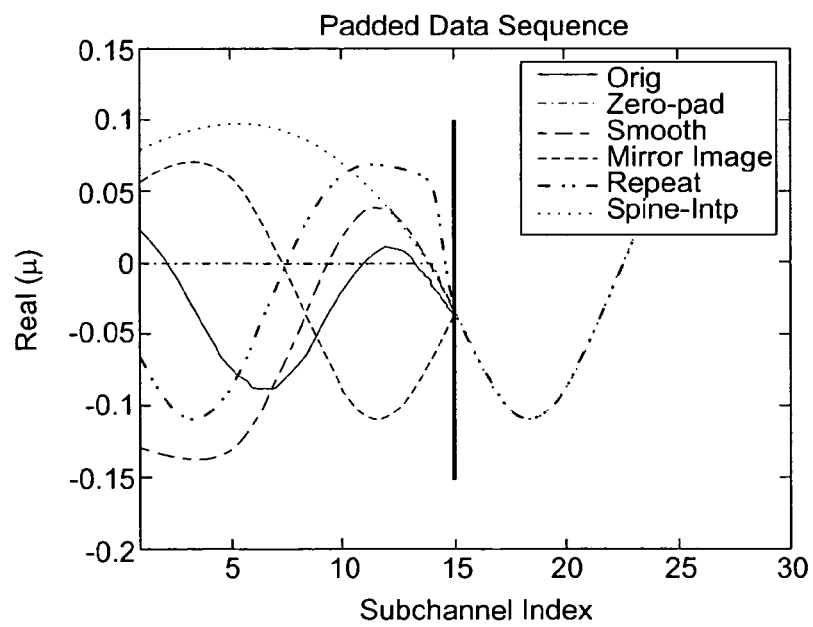
FIG. 10 illustrate the extended frequency spectrum according to an embodiment of the invention.

Instead of using Wiener filtering to estimate the actual channel frequency response in the null spectrum, we investigated the following four simple methods to extend the CEV, as shown in FIG. 10, 1. All zero padding, where two data vectors, $\bar{a}_1$ and $\bar{a}_2$ are all-zero sequences (Zero-padding),
2. Data padding for smooth curve on both boundaries (Smooth-padding),
3. Padding the mirror image of the $L_1$ and $L_2$ data block on each side of the original K-symbol vector (Symmetric-padding), 4. Padding the repetition of the $L_1$ and $L_2$ data block on each side of the original K-symbol vector (Repeat-padding).

The Zero-padding is the conventional method, which is listed here as a reference for comparison. As shown in FIG. 10, the N-point sequence generated by Zero-padding introduces significant discontinuity on both sides of the active spectrum, which causes the so-called "edge effect".

In order to mitigate the "edge effect", in the Smooth-padding method, the original vector is extended such that the curve is smoothly extended on the edges as, $$\tilde{H}_P^e(k) = \begin{cases} 2\tilde{H}_P(0) - \tilde{H}_P(k_1 - k) & 0 \le k < k_1 \\ \tilde{H}_P(k - k_1) & k_1 \le k \le k_2 \\ 2\tilde{H}_P(k_2) - \tilde{H}_P(2k_2 - k) & k_2 < k < M \end{cases} \quad (33)$$

It is shown in FIG. 10 that the extended channel frequency response generated by this method looks "continuous" at both boundaries of the active spectrum. Discontinuity still exists at the boundaries of the extended spectrum, but it is moved far away from the active spectrum. Therefore, the edge effect is significantly reduced in the active spectrum.

The Symmetric-padding method comprises appending the mirror image of a sub-vector on both sides of the LS CEV. The curve is most likely not smooth when looking at the small local area around the edges. However, it does provide a "smoother" transition if these small local areas are ignored. It will be shown hereinbelow that, in flat-fading channels, this method actually provides better performance than the Smooth-padding method.

In the Repeat-padding method, the first $L_1$ entries of $\tilde{H}_P$ are copied in $\bar{a}_1$ and the last entries of $\tilde{H}_P$ are copied in $\bar{a}_2$. Although this method adds VPs in the null spectrum, it keeps a significant amount of the discontinuity between the active and null spectrum, which results in inferior performance compared to the Smooth and Symmetric padding methods.

It is noted that in the above data-padding methods, we no longer perform channel estimation of the original channel, strictly speaking. We are essentially estimating a Pseudo channel with the original channel frequency response inside the active spectrum and an assumed channel frequency response in the null spectrum. In FIG. 10, the original channel frequency response in the null spectrum is also plotted. It is shown that each method works with a Pseudo channel frequency response different from the original channel. The criterion here is to find a Pseudo channel which provides the least discontinuity.

On the other hand, although the discontinuity is mitigated, the Pseudo channel unlikely keeps the "band-limiting" property of the actual channel in the cepstrum domain. Performing windowing introduces additional MSE due to the discarding of the high frequency component of the Pseudo channel. Furthermore, the noise contained in the padding data, i.e., LS channel estimates, on both sides introduces more estimation error. The target is to find a solution which significantly reduces the edge effect while keeping most of the "band-limiting" property.

With all four methods to extend the pilot vector into the null spectrum, discontinuity still exists at the boundaries of the extended spectrum. One method is to add longer padding sequences on both sides of the active spectrum to keep the discontinuity further away from the active spectrum. However, adding longer padding sequence not only causes more distortion to the cepstrum band-limiting property but also introduces more noise into the channel estimation process. In an embodiment according to the invention spectrum shaping is applied to the extended channel estimation vector $\tilde{H}_P^e$. The first shaping window considered is the Hanning window.

$$w(m) = \begin{cases} 0.5 + 0.5\cos(2\pi m / N_t) & |m| \le N_t / 2 \\ 0 & \text{otherwise} \end{cases} \quad (34)$$

Applying the Hanning window makes the windowed PCEV converge to zero on both ends of the extended spectrum $\tilde{H}_P^e$ and therefore reduces the discontinuity. To apply this spectrum shaping, Eq. (28) becomes, $$\tilde{G}_P^e(m) = DFT_{M_e}\{\tilde{H}_P^e(k) \cdot w_P(k)\} \quad (35)$$

where $w_P(k)$ is a vector comprising the shaping window coefficients on the pilot subcarrier indexes and $M_e$ is the length of the extended spectrum. After the DFT-interpolation, a reverse shaping is applied to re-equalize the channel estimations as, $$\hat{H}(k) = \frac{IDFT_K\{\tilde{G}_{WP\_INTP}^e(m)\}}{w(k)} \quad (36)$$

It is noted that it is possible to apply such shaping to the active spectrum $\tilde{H}_P$ only, instead of the extended spectrum $\tilde{H}_P^e$. This method has been implemented in combination with an optimal MMSE weighting. However, such windowing achieves "continuity" on the boundaries by decreasing the windowed value to zero as the index moves to the two edges, as shown in Eq. (35). When making the re-adjustment with Eq. (36), small errors of the channel estimation close to the edges of $\tilde{H}_P$ are boosted due to the near-zero values of w(k) in these areas. Simulations showed that this actually leads to even larger channel estimation MSE compared to the case without shaping.

On the other hand, applying the window shaping to the expanded spectrum puts the near-zero shaping coefficients inside the null spectrum, away from the active spectrum of interest. In order to pursue the best performance, a search is performed to find the optimal generalized Hanning window—or other type of shaping windows—defined as, $$w(m) = \begin{cases} 0.5 + 0.5\cos\left(\frac{2\pi m}{A \cdot N_t}\right) & |m| \le N_t / 2 \\ 0 & \text{otherwise} \end{cases} \quad (37)$$

where A is the generalization factor, which determines the discontinuity at the edges of the Hanning window. The optimal A provides the best compromise between the MSE introduced by the discontinuity and the MSE caused by the noise boosting in Eq. (36).

In the DVB-T/H/SH systems, there is one scattered pilot every 12 subcarriers. Since 12 is not a power of 2, an issue arises when an FFT is used for the interpolation. For the DVB-T/H/SH 2 k mode, the FFT block size is 2048, while the closest block size which is divisible by 12 is 2052. Performing a DFT-interpolation with a 2052-point IDFT is an optimal solution, assuming that the channel under consideration meets the Nyquist theorem in frequency with the specific pilot structure. However, performing a 2048-point IFFT instead of the 2052-point IDFT will cause performance degradation.

Let's assume that the channel delay spread is limited to Δ samples, which is smaller than the cyclic prefix length G. The channel impulse response is obtained from the scattered pilots as, $$\hat{h}(n) = IDFT_M\{\tilde{H}_P(k)\} \quad (38)$$
$$= \sum_{k=0}^{M-1} \tilde{H}_P(k) \cdot e^{j2\pi\frac{mk}{M}}$$

where M is the number of pilots.

Assuming perfect LS channel estimation from the pilots, the channel estimation error is then caused solely by the application of an FFT, Eq. (38) becomes, $$\hat{h}(n) = \sum_{k=0}^{M-1} \tilde{H}_P(k) \cdot e^{j2\pi\frac{mk}{M}} = h(n) \quad (39)$$

The DFT interpolation is performed by first padding $N_D-M$ zeros to the time-domain channel impulse response h(n), $$h_{N_D}(n) = \{h(n), (N_D-M)\text{zeros}\} \quad (40)$$

followed by a $N_D$-point DFT operation, $$H_D(k) = DFT_{N_D}\{h_{N_D}(n)\} \quad (41)$$
$$= \sum_{n=0}^{N_D-1} h_N(n) \cdot e^{-j2\pi\frac{nk}{N_D}}$$
$$= \sum_{n=0}^{\Delta-1} h(n) \cdot e^{-j2\pi\frac{nk}{N_D}}$$

It is shown that for k=mL+1, where L is the subcarrier spacing, $H_D(k)=H_P(m)$. When an N-point FFT interpolation is applied, N-M zeros are first padded to h(n) as, $$h_N(n) = \{h(n), (N-M)\text{zeros}\} \quad (42)$$

and the N-point FFT is then applied, $$H_F(k) = FFT_N\{h_N(n)\} \quad (43)$$
$$= \sum_{n=0}^{N-1} h_N(n) \cdot e^{-j2\pi\frac{nk}{N}}$$
$$= \sum_{n=0}^{\Delta-1} h(n) \cdot e^{-j2\pi\frac{nk}{N}}$$

The difference between the DFT-interpolation and the FFT-interpolation is calculated as, $$D_H(k) = H_D(k) - H_F(k) \quad (44)$$
$$= \sum_{n=0}^{\Delta-1} h(n) \cdot \left(e^{-j2\pi\frac{nk}{N_D}} - e^{-j2\pi\frac{nk}{N}}\right)$$
$$= \sum_{n=0}^{\Delta-1} h(n) \cdot e^{-j2\pi\frac{nk}{N}} \cdot e^{-j\pi\frac{N-N}{N-N} \cdot nk} \cdot$$
$$2j \cdot \sin\left(\pi\frac{N-N}{N-N} \cdot nk\right)$$

Assuming h(n) are i.i.d. Gaussian random variables with zero mean and variance 1/Δ—to guarantee a total path gain of 1, the MSE of $D_H(k)$ is calculated as, $$\sigma_D^2(k) = \sum_{n=0}^{\Delta-1} \sigma_h^2 \cdot 4 \cdot \sin^2\left(\pi\frac{d_N}{N_D \cdot N}nk\right) \quad (45)$$

where $d_N=N_D-N$.

Figure 11:
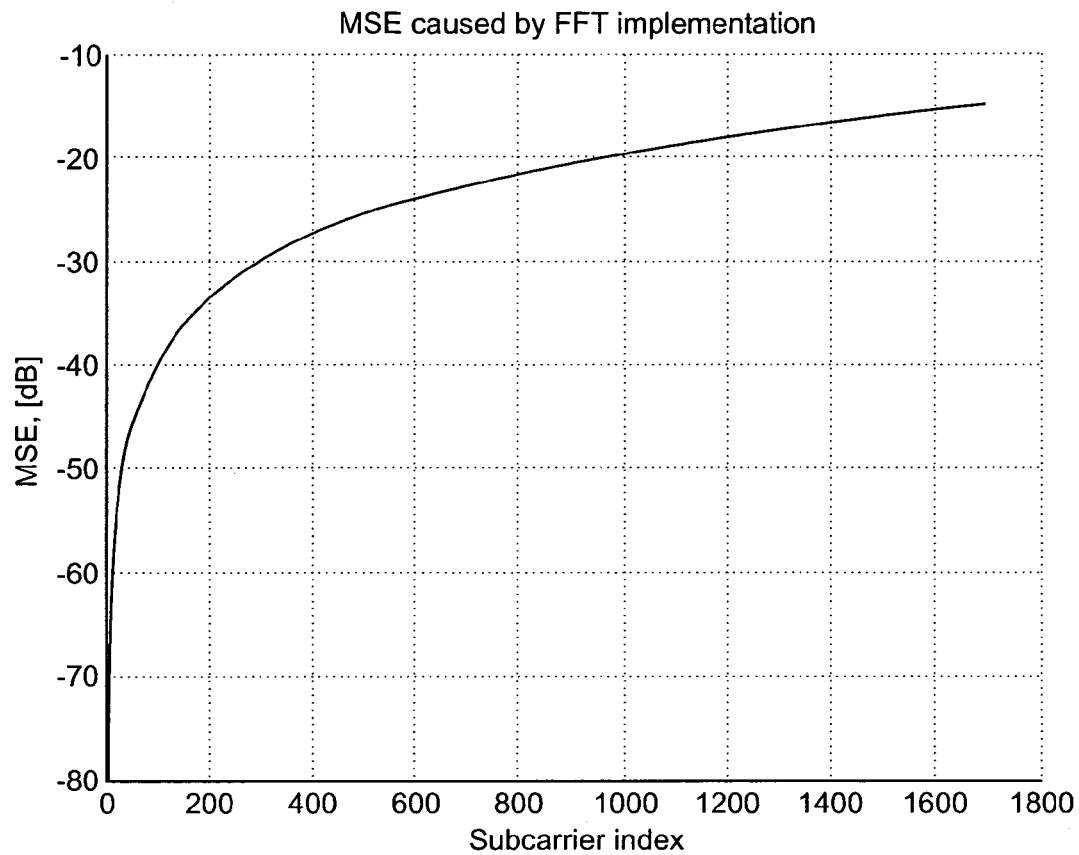
FIG. 11 illustrates the large the large channel (or ICI) gain estimation MSE obtained from performing FFT directly in DFT-interpolation-based channel estimation method, when the pilot spacing is not divisible by the OFDM block size.

The MSE is calculated for a DFT size of 2052 and an FFT size of 2048 and is plotted in FIG. 11. It is shown that there is an obvious estimation error caused by the application of an FFT instead of a DFT.

In embodiments according to the invention comprise two methods to replace the DFT operation with an FFT followed by linear interpolation (FFT-Intp).

The first method is based on the fact that performing a DFT with different number of points over the same time-domain sequence is equivalent to sampling the frequency-domain spectrum of this sequence with a different resolution. In this case, the 2052-point frequency response sampled with a resolution of $F_s/2052$ is obtained directly by linear interpolation from the 2048-point frequency response sampled at $F_s/2048$, where $F_s$ is the sample frequency. In this solution, only the interpolation coefficients for each point need to be found, which are fixed for all scenarios. This, however, requires the storage of 4100 interpolation coefficients.

In the above example, 28 VPs are added on the two sides of the active spectrum of 143 pilots so that a total of 171 pilots cover the extended spectrum which is divided into 2048 sub-channels. A second solution is to add 113 VPs to the 143 active pilots so that the total number of pilots is now 256. A 256-point FFT is then performed to convert the extended channel frequency response into the cepstrum domain. The 256-point cepstrum is then expanded into a 4096-point vector by padding zeros. A 4096-point IFFT is then applied to perform the interpolation and obtain a 4096-point frequency response for the extended channel.

Figure 12:
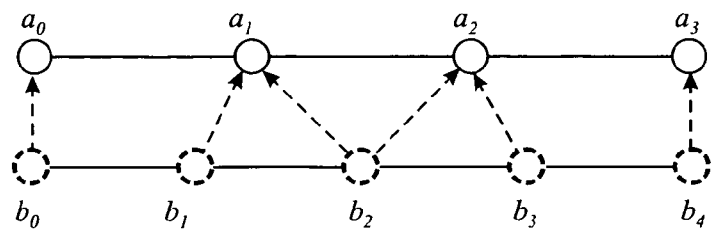
FIG. 12 illustrates a linear interpolation to be combined with an FFT in order to replace the DFT operation in DFT-interpolation according to an embodiment of the invention.

Since the interpolation factor is now 16, instead of 12, we obtain a frequency response sequence over-sampled by a factor of 4/3. A linear interpolation is subsequently performed to obtain the frequency response of each subcarrier, as shown in FIG. 12.

This figure shows that four subcarrier channel frequency responses are obtained from every five points from the over-sampled 4096-point sequence as, $$a_0 = b_0, \quad a_1 = \frac{2}{3}b_1 + \frac{1}{3}b_2, \quad a_2 = \frac{1}{3}b_2 + \frac{2}{3}b_3, \quad a_3 = b_4 \quad (46)$$

where the next block of $\overline{a}$ and $\overline{b}$ overlaps the current block on the last samples.

When decision-feedbacks are available, each subcarrier becomes a "pilot" assuming all feedback decisions are correct. In this case, LS channel estimation is calculated for each subcarrier and K LS estimates are obtained. DFT/IDFT-filtering is applied to this LS vector to improve the channel estimation accuracy by discarding a significant part of the wideband channel estimation noise, caused by both additive noise (AWGN and ICI) and incorrect decision feedbacks. Since this operation is no longer an interpolation, we refer to it as DFT/IDFT-filtering. The DFT/IDFT-filtering process follows the operations for DFT/IDFT-interpolation described above, except that the LS channel estimation vector contains all active subcarriers.

Due to the fact that there is discontinuity on the edge of the active spectrum, the "edge effect" still exists causes performance degradation. This "edge effect" is mitigated by extending the LS channel estimation vector on both sides so as to obtain smooth curve transmissions on the boundaries of the active spectrum. The discontinuity of the extended channel frequency response vector—i.e., including the null spectrum—is reduced by applying the spectrum shaping as described above.

Simulation results of a COFDM receiver with the channel estimation processes according to embodiments of the invention are presented hereinbelow. The COFDM system is assumed to have:

1705 active subcarriers,
2048-point IFFT/FFT for OFDM modulation/demodulation,
In case of DFT-interpolation with padding data, the total extended sequence consists of 2052 points, i.e., the closest multiple of 12 to 2048.
a pilot structure similar to the scattered-pilot structure of the DVB-T/H/SH system in the 2 k mode, with pilot spacing of 12 and time-varying pilot locations repeating every four OFDM symbols, as shown in FIG. 9,
64QAM modulation,
a rate-½ convolutional code, In these simulations, it is assumed that the channel is static and frequency selective, with a uniform power delay profile. Each MSE curve is obtained as an average over 10000 channel realizations. Unless otherwise specified, a channel delay spread of 40 samples is assumed.

Figure 13:
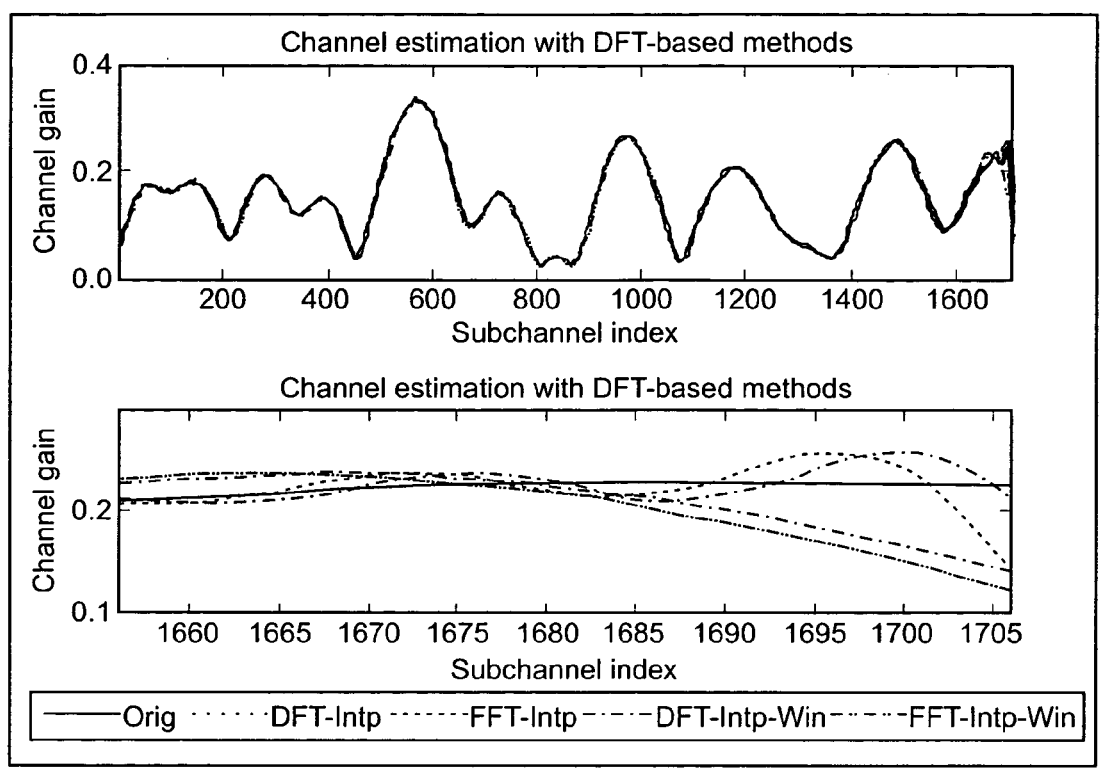
FIGS. 13-24 illustrate simulation results for different embodiments according to the invention for mitigating the edge affect caused by null subcarriers.

FIG. 13 illustrates the channel estimation MSE when the conventional zero-padding-based DFT/IDFT-interpolation and FFT-interpolation is used, with and without windowing, assuming no additive noise. It is observed that, at high SNR, for the given channel, all methods result in channel estimation very close to the original channel at the center part of the spectrum. However, the "edge effect" is very obvious at the subcarriers near the edges of the active spectrum, as shown in the second diagram in FIG. 13. Since there is no additive noise, the windowing does not provide performance improvement. On the other hand, it likely introduces performance degradation to the subcarriers on the boundaries due to the fact that the padded channel frequency response is no longer "band-limited" in the cepstrum domain. Filtering out the higher frequency component removes part of the signal component together with the wideband noise component. Since the high frequency component is mainly introduced by the discontinuities on the boundaries, removing these components will cause damage to the subcarriers close to boundaries.

Figure 14:
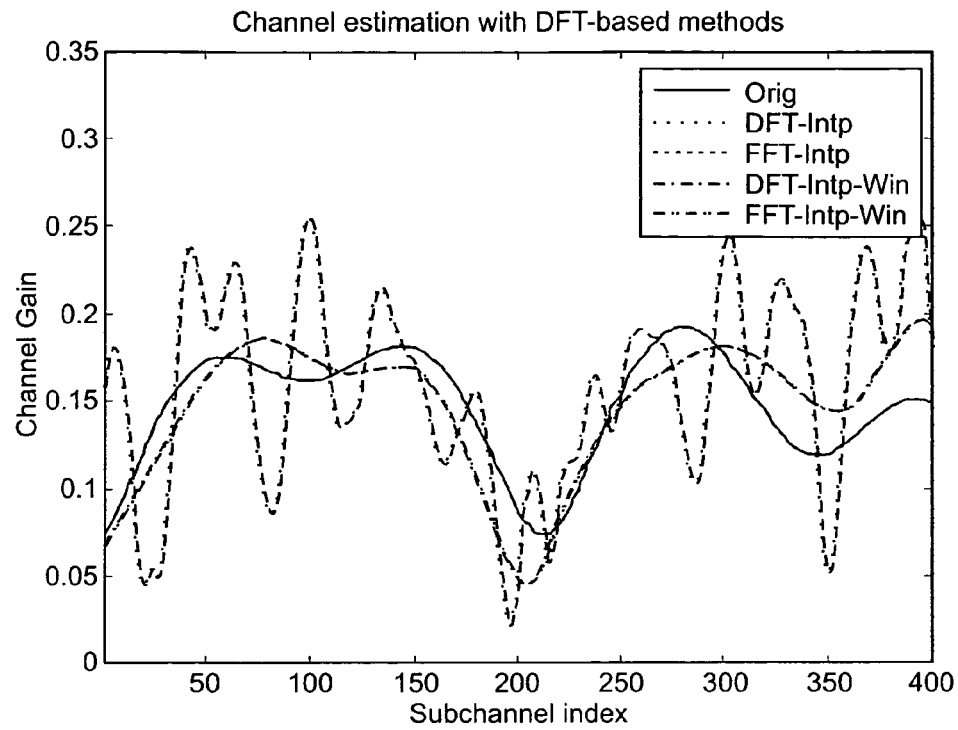

In FIG. 14, the same curves are presented for the same frequency selective fading channel for a low SNR scenario, with an $E_b/N_0$ of 10 dB. The channel estimates are not as accurate comparing to the high SNR case. Significant performance improvement is observed when filtering is applied.

In order to compare the performances of the DFT-based channel estimation with different data padding methods, we calculate the MSE of the channel estimates obtained by simulations over each subchannel as, $$\mu_k = E\{|H_k - \hat{H}_k|^2\} \tag{47}$$

where k is the subchannel index and the average is over 10000 channel realizations.

Figure 15:
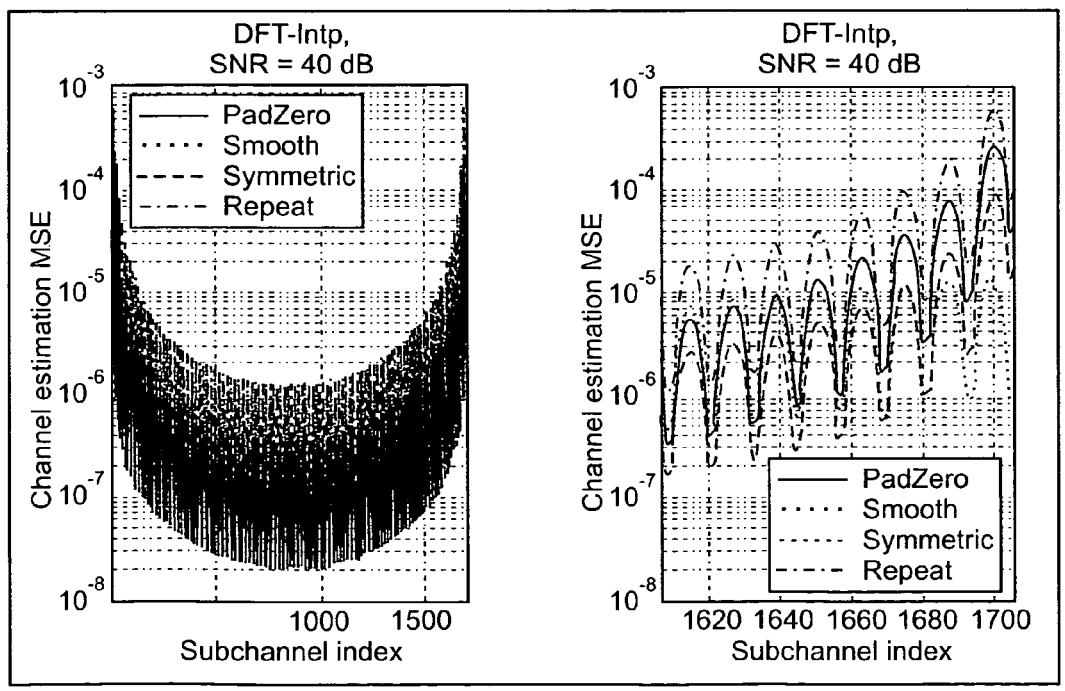

FIG. 15 illustrates the subcarrier MSEs obtained from different channel estimation methods. With a high $E_b/N_0$ of 40 dB, this figure reveals the inherent weakness of the channel estimation methods. It is obvious that all methods still suffer the "edge effect", which is plotted in detail in the second subplot. The "edge effect" is significant for Repeat-padding and Zero-padding methods. In case of Smooth-padding, the "edge effect" is significantly reduced, where the MSE of the edge subcarriers is more than 10 times lower than that for Repeat-padding. The Symmetric-padding method provides a different trade-off on the "edge effect". It suffers significantly worse MSE on the subcarriers very close to the boundary, where the MSE quickly decreases for subcarriers away from the boundary. In the example shown in FIG. 15, the MSE of the Symmetric-padding method becomes better than the Smooth-padding method for subcarriers with index lower than 1675. It can also be shown that at the center of the spectrum, the Repeat-padding and Smooth-padding suffers slightly higher MSE than the Symmetric and Zero-padding methods. This small difference on the MSE obtained from different methods for the center subcarriers is insignificant and is unlikely to cause any difference in detection performance. The system performance is most likely degraded by the high MSE on the edge subcarriers.

Figure 16:
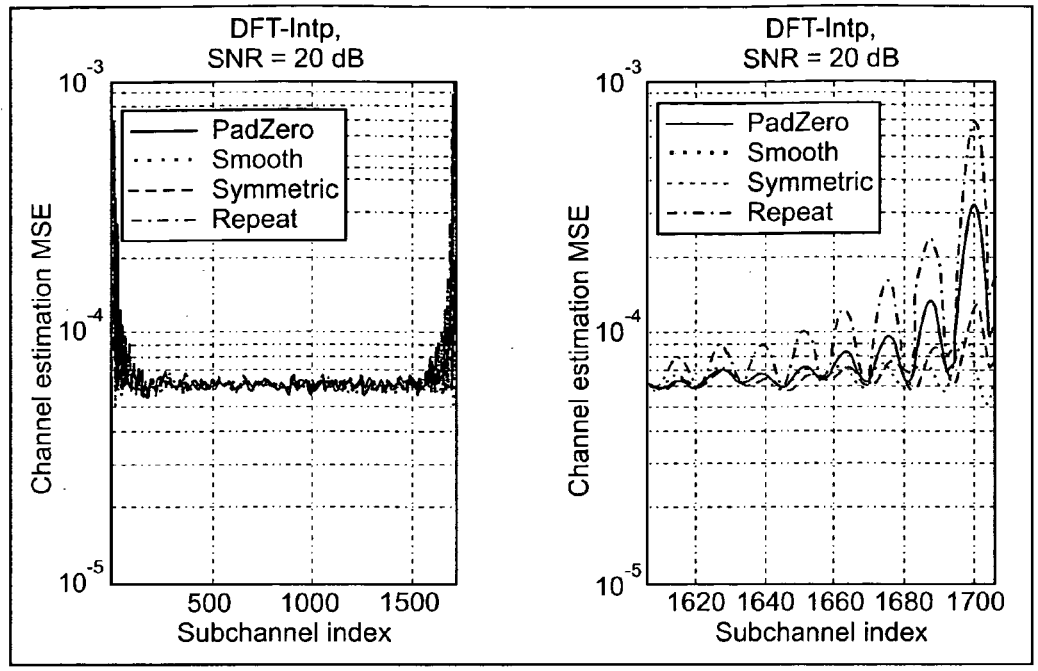

FIG. 16 illustrates the MSE performance of the channel estimation with different data-padding methods at a more practical $E_b/N_0$ value of 20 dB. It is observed that the MSEs on the edge subcarriers for different methods are closer compared to those shown in FIG. 15. This is due to the fact that the additive noise becomes one of the major contributors to the MSE which is common to all methods. For Zero-padding and Repeat-padding methods, the MSE on the edge subcarriers increases only slightly since the "edge effect" is still the major contributor. However, for Symmetric-padding and Smooth-padding, the MSE on these subcarriers increases significantly, indicating that the major contributor is the additive noise.

Figure 17:
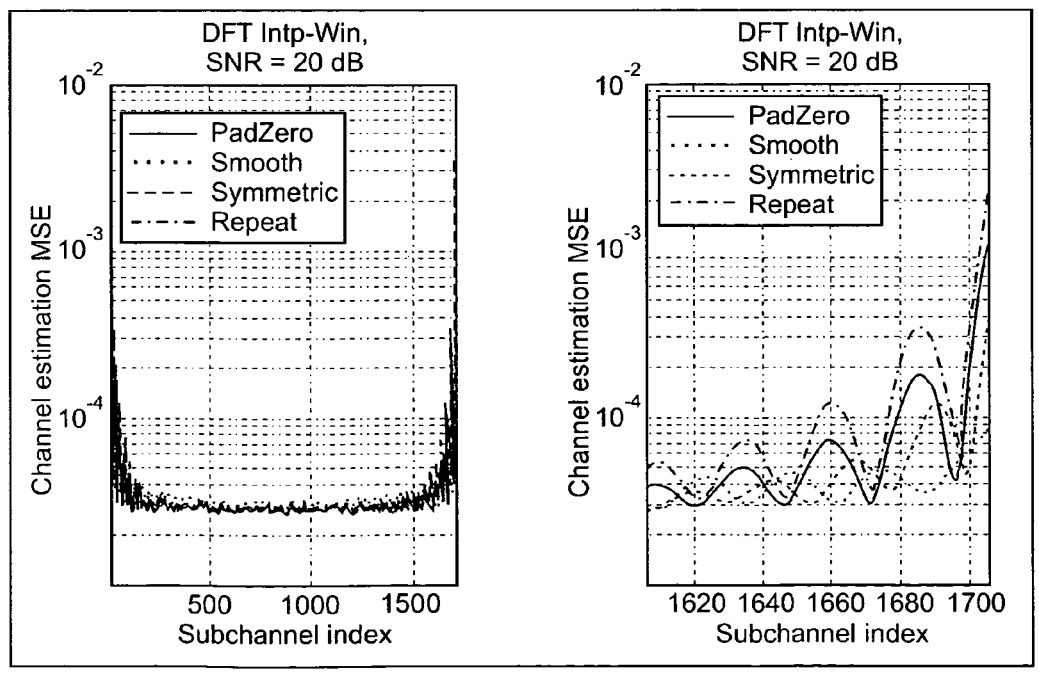

At this $E_b/N_0$, since the additive noise is no longer insignificant, applying windowing provides performance improvement by removing a significant portion of the noise. FIG. 17 illustrates the MSE performance of the different channel estimation methods with cepstrum-domain windowing. The window size is chosen to be as large as the channel delay spread to achieve the optimal performance. It is observed in this figure that the channel estimation MSE is significantly improved for subcarriers inside the spectrum. On the other hand, the "edge effect" becomes worse with the windowing. It is also observed that the MSE of the Smooth-padding method does not suffer degradation as significant as other methods.

Figure 18:
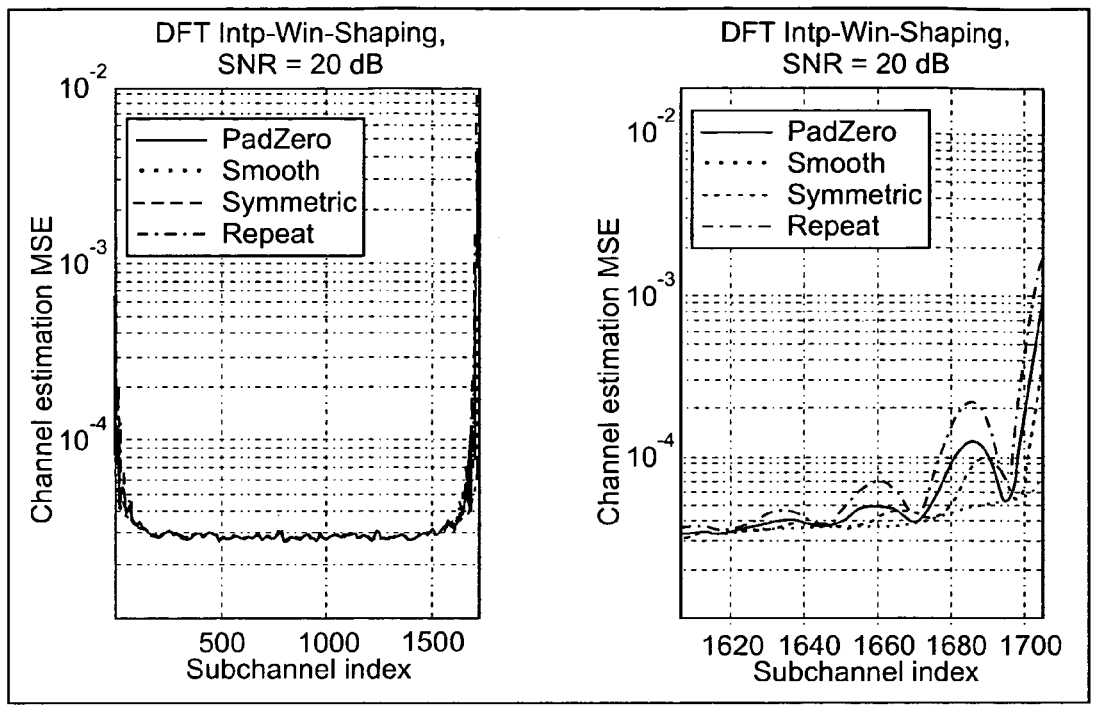

In order to further mitigate the "edge effect" of the data-padding-based channel estimation methods, the Hanning window is applied to shape the channel frequency response. The channel estimation MSE results obtained by simulation with this spectrum shaping are shown in FIG. 18. Applying spectrum shaping significantly improves the MSE performance when the Smooth-padding is used. For the other data padding methods, the MSE improvement is not as significant. Furthermore, the MSE becomes more uniform with the shaping applied.

Figure 19:
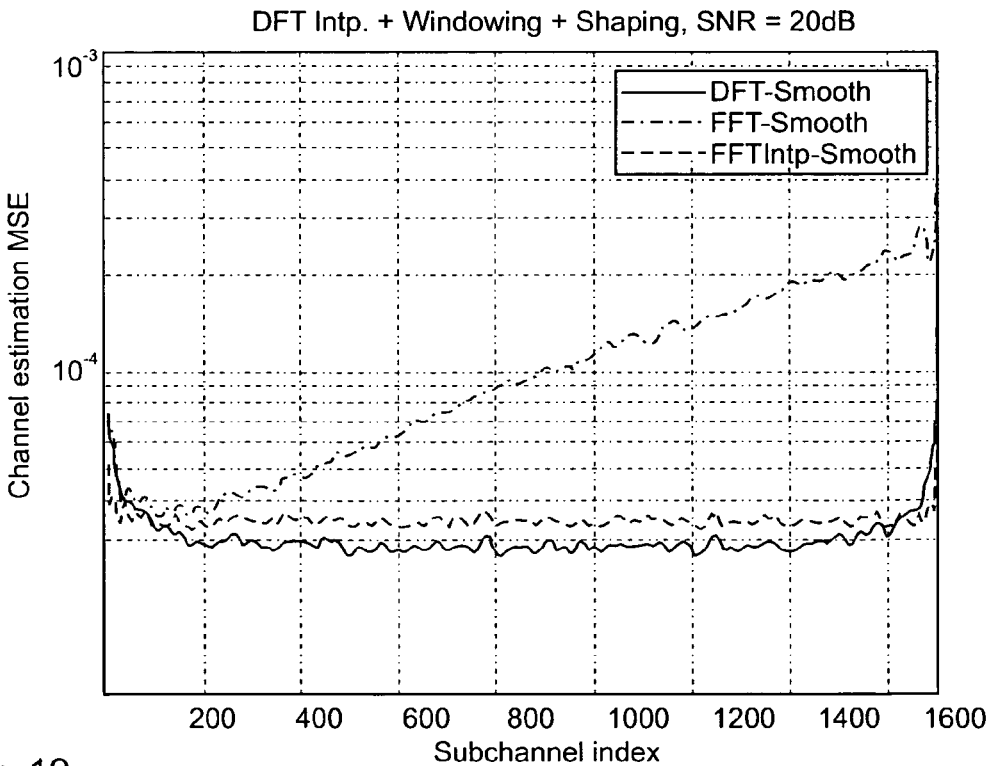

FIG. 19 illustrates the performance degradation caused by applying FFT-interpolation instead of DFT interpolation. It is clearly shown that at this $E_b/N_0$, the FFT-interpolation provides significant MSE performance degradation due to the unevenly distributed pilots at the end of the spectrum. Performance obtained with the second FFTIntp method is also plotted in this figure, which shows a performance close to that of DFT-based interpolation, as well as a better "edge effect".

Figure 20:
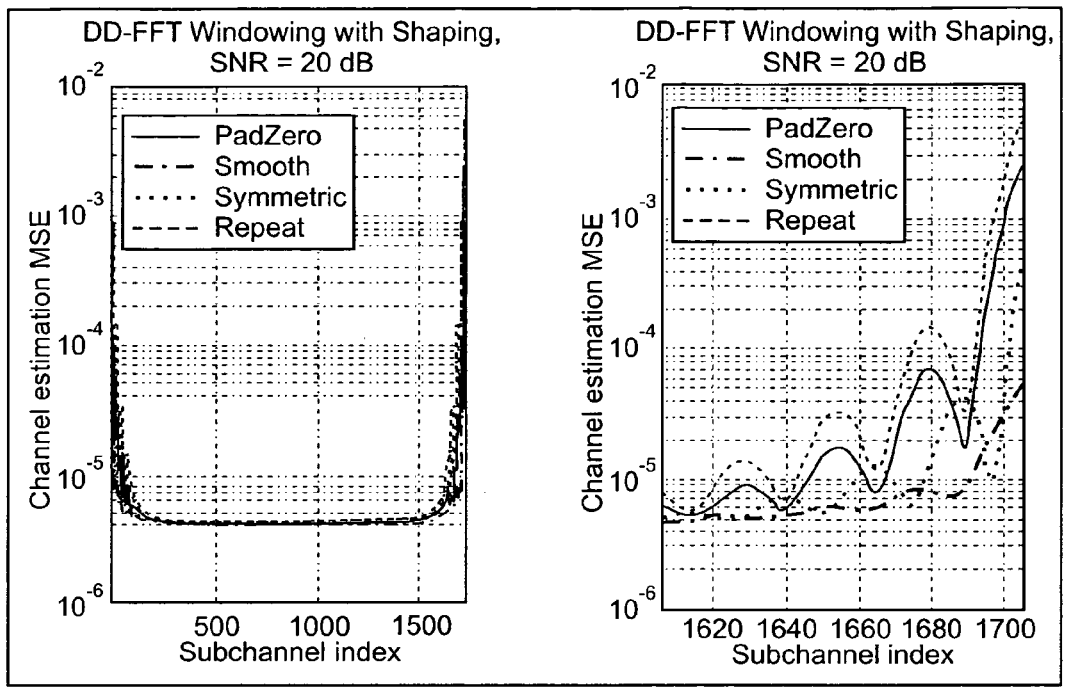

FIG. 20 illustrates the MSE performance of the decision-directed DFT-interpolation-based channel estimation methods. Since there is no interpolation, performing FFT instead of DFT does not result in the performance degradation as shown in FIG. 19. It is observed that the MSE on the inner subcarriers is much better than the interpolation-based solution. However, the "edge effect" is more or less on the same level. Therefore, applying Smooth data padding is still an effective way to reduce the "edge effect".

The mobile channel model used in the simulation is a scaled Typical Urban (TU) wireless channel profile. It has the similar power delay profile shape as the TU channel but is linearly scaled to the specified multipath delay spread. Furthermore, the Doppler spectrum of all the incoming waves follows the Jake's model.

Figure 21:
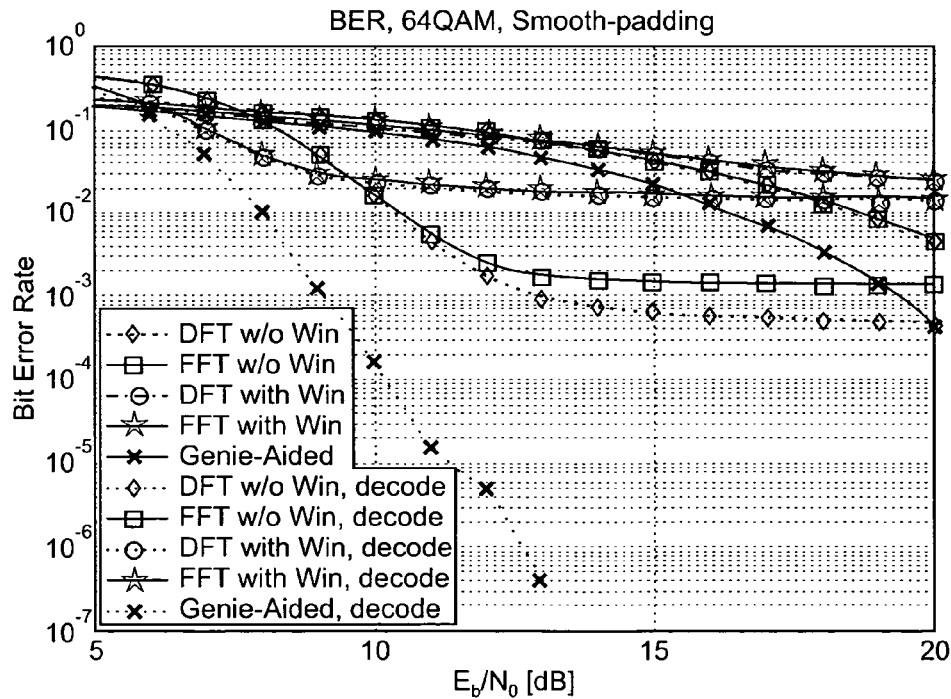

FIG. 21 illustrates the BER performances of the COFDM system with channel estimation based on Zero-padding in AWGN channel, which is the extreme case of frequency-flat fading channels. From FIG. 21 follows Performance of Zero-padding based DFT-interpolation is substantially worse than that obtained assuming perfect channel estimation.

An error floor occurs at $4 \cdot 10^{-4}$.

FFT-based solution presents a higher error floor compared to DFT-based solution.

Performing windowing causes a significantly higher error floor, due to the boosted MSE on the edge subcarriers.

Figure 22:
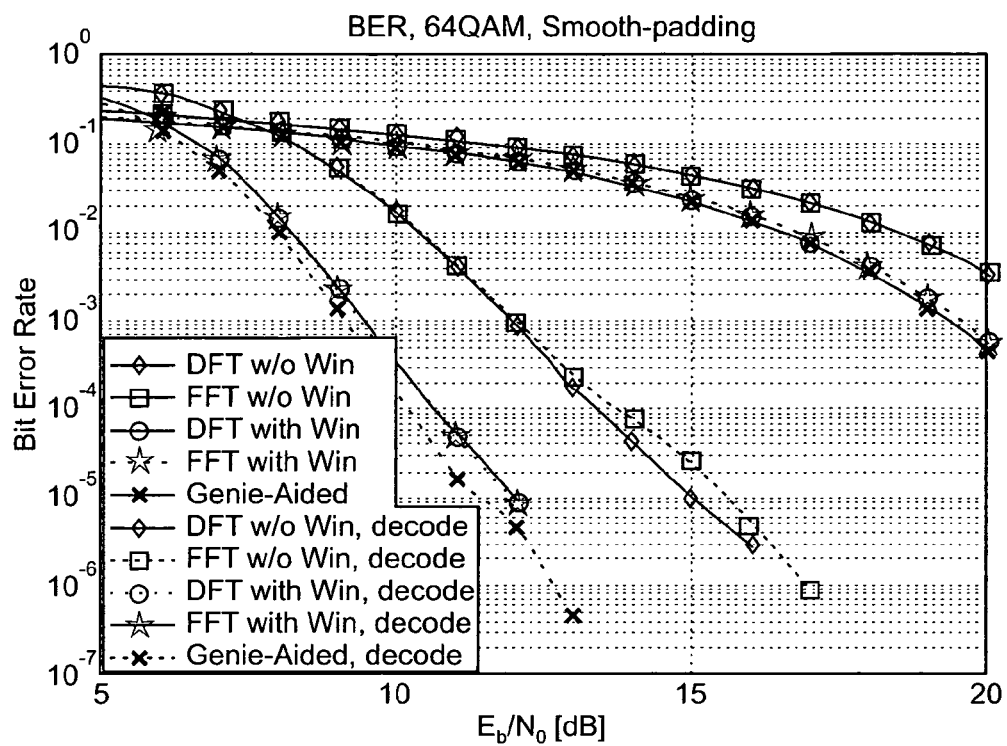

FIG. 22 illustrates performance curves when applying Smooth-padding with spectrum shaping. Significant performance improvement is achieved and no error floor is observed.

Figure 23:
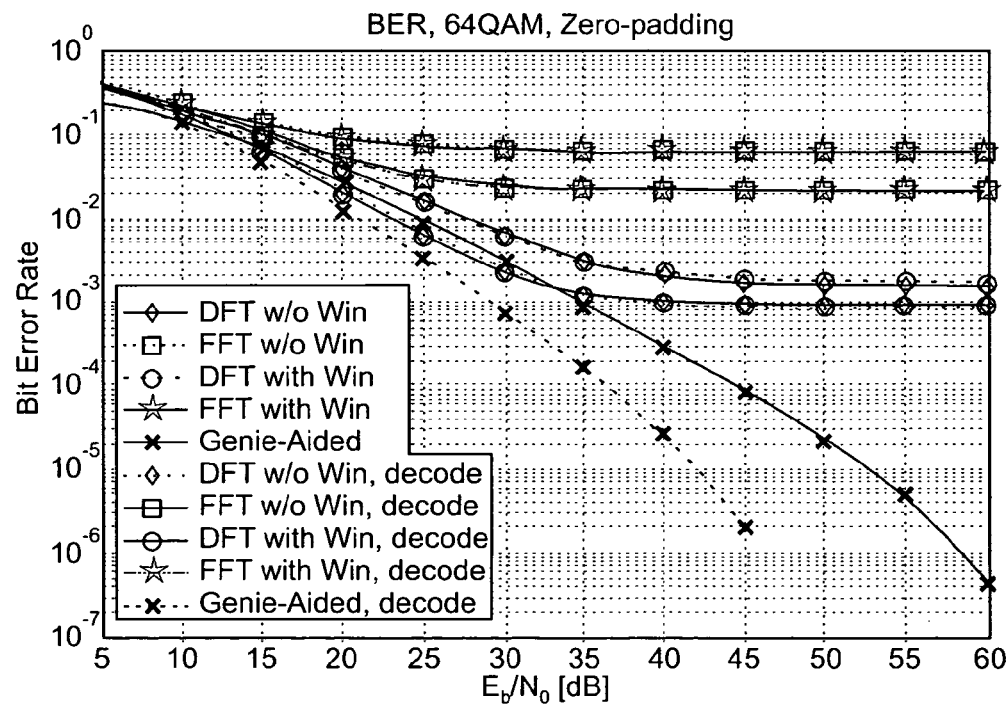

FIG. 23 illustrates performance curves of the channel estimation based on Zero-padding in frequency-selective fading channels, where the following observations are made Performance of the OFDM receiver with channel estimation based on Zero-padding is much worse than that obtained with perfect channel estimation.

An error floor occurs at $10^{-3}$.

FFT-based solution present a much higher error floor compared to DFT-based solution, which makes it necessary to use the FFTIntp solution.

Figure 24:
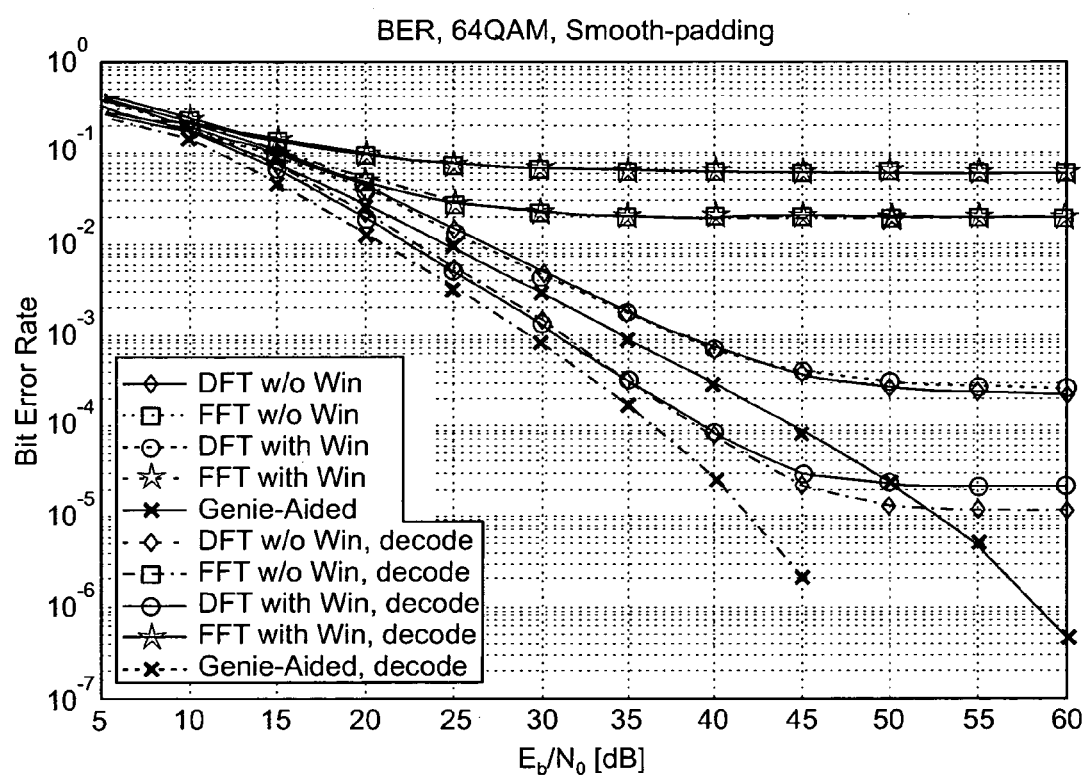

FIG. 24 illustrates performance curves when applying Smooth-padding with spectrum shaping. Performance improvement is not obvious for low to medium SNR values. On the other hand, the error floor occurs at around $10^{-5}$, which is substantially lower than that obtained with the Zero-padding method.

It is noted that the above embodiments of the invention for mitigating the edge effect are not limited to the DVB OFDM systems, but also to other OFDM systems with Null spectrum, where DFT/IDFT interpolation with filtering is applied in case of pilot-aided channel estimation, or/and DFT/IDFT filtering is applied in case of decision-aided channel estimation and ICI gain estimation.

Figure 25:
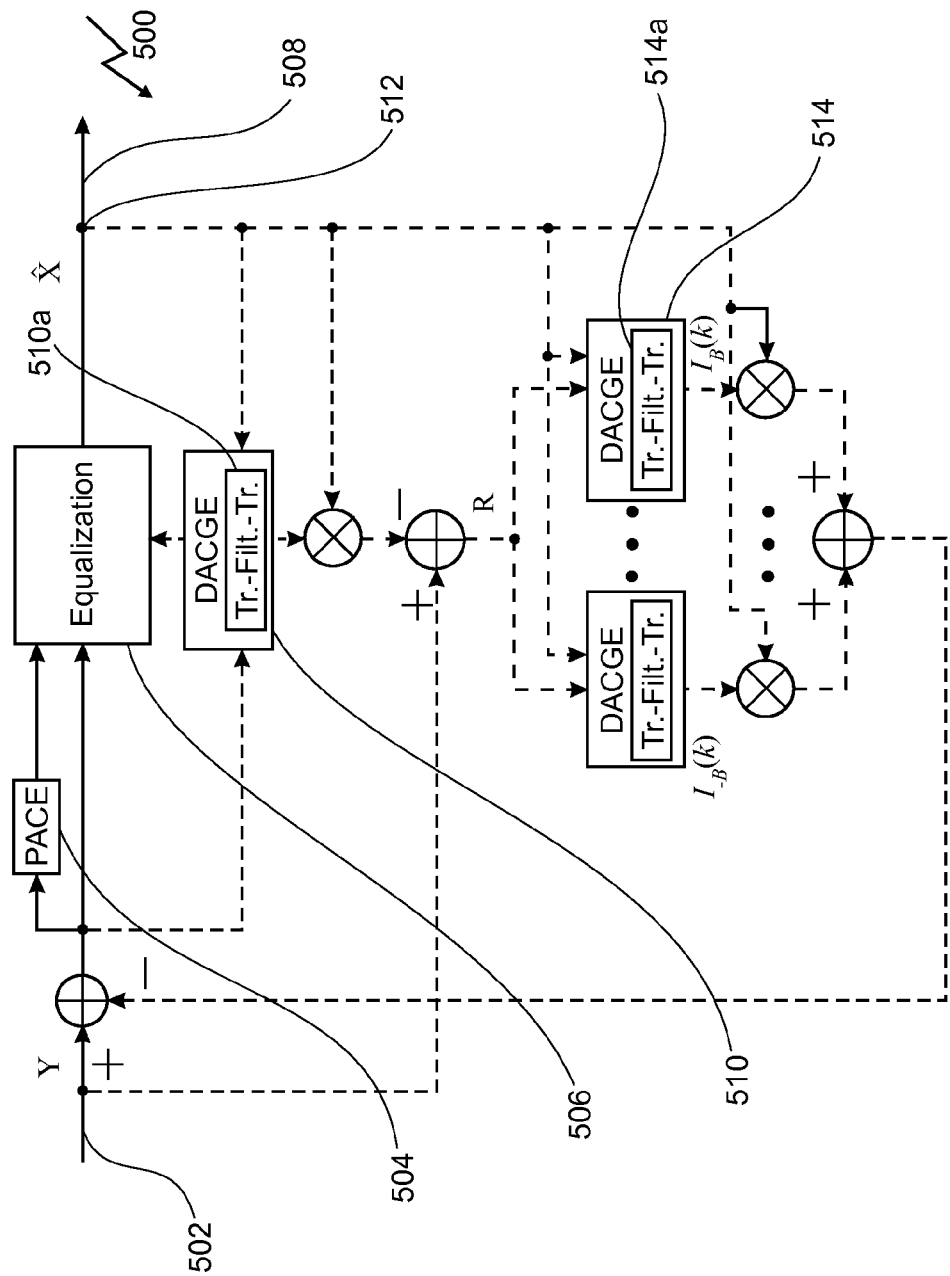
FIG. 25 is a simplified block diagram of a receiver according to an embodiment of the invention.
Figure 26:
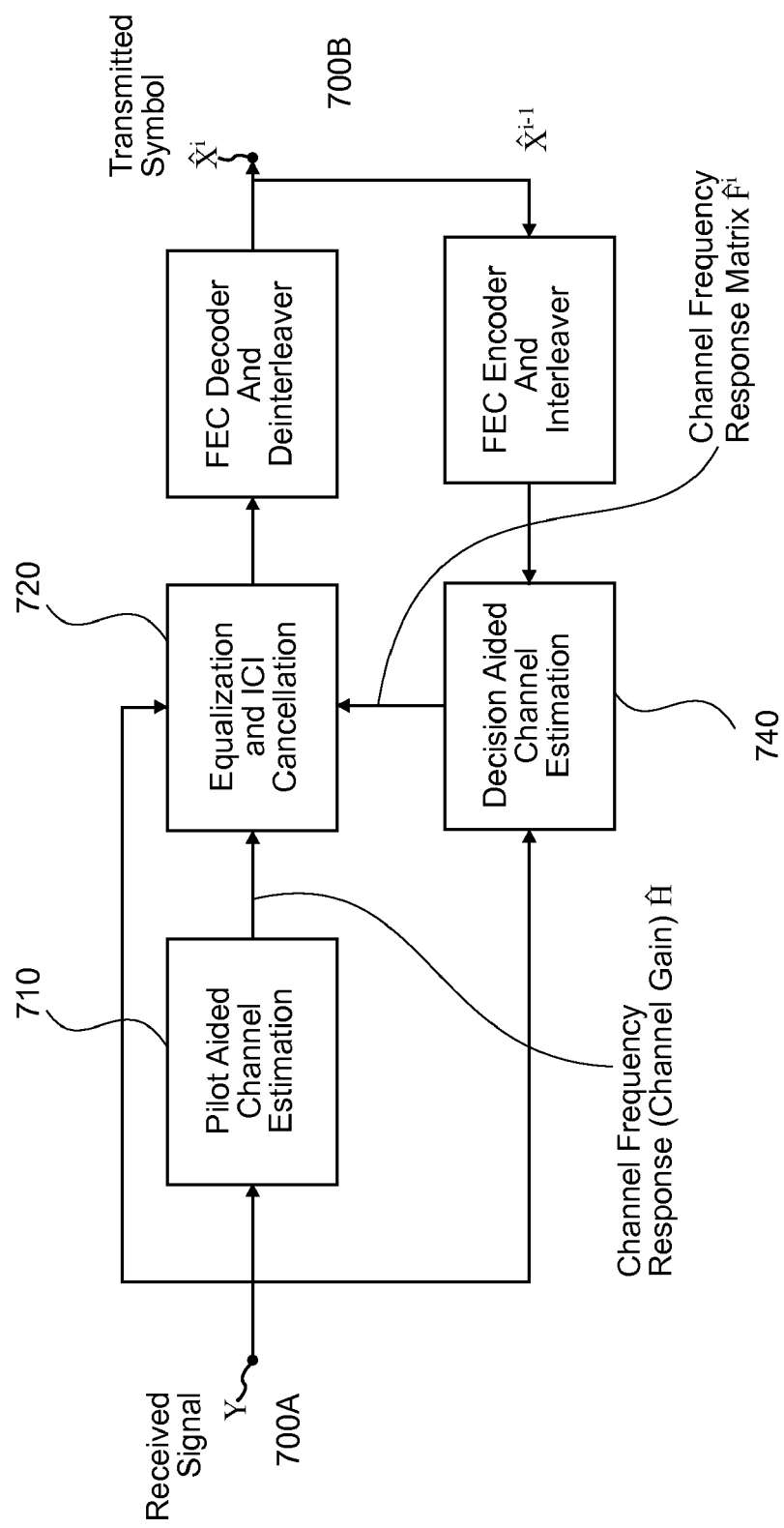
FIG. 26 illustrates schematically functioning blocks of the iterative channel estimation and ICI cancellation process according to an embodiment of the invention where Forward Error Control (FEC) decoder and deinterleaver are included to counteract the effect of FEC encoder and interleaver at the transmitter.

Referring to FIG. 25, a simplified block diagram of a receiver 500 according to an embodiment of the invention is shown. The receiver 500 comprises an input port 502 for receiving a signal comprising a plurality of subcarriers. A pilot-aided channel estimator 504 is connected to the input port 502. The pilot-aided channel estimator 504 processes the signal by performing pilot-aided channel estimation for determining a first estimate of channel gain at each subcarrier. A decision block 506 is connected to the pilot-aided channel estimator 504 and to the input port 502. The decision block 506 determines a decision signal in dependence upon an estimate of channel gain at each subcarrier and an estimate of inter carrier interference gains at each subcarrier. Output port 508 is connected to the decision block 506 for providing the decision signal. Decision aided channel gain estimation block 510 is connected to the input port 502, the decision block 506 and to a node 512 interposed between the decision block 506 and the output port 508. The decision aided channel gain estimation block 510 determines an estimate of channel gain at each subcarrier corresponding to a diagonal vector of a channel frequency response matrix and for providing the estimate of channel gain at each subcarrier to the decision block 506. The block 514 determines an estimate of inter carrier interference gains at each subcarrier corresponding to off-diagonal vectors of the channel frequency response matrix in dependence upon the received signal and the decision signal. Inter carrier interference gain estimation is performed in inter carrier interference gain estimation block 514—k parallel blocks, i.e. one block for each off-diagonal vector or, alternatively, in series. Optionally, the decision block 506 and/or the decision aided channel gain estimation block 510, inter carrier interference gain estimation block 514 comprises a filter circuit. Optionally, the decision aided channel gain estimation block 510 comprises a circuit 510a for transforming the estimates of channel gain from frequency domain into spectrum domain, for filtering the spectrum for determining a filtered spectrum, and for transforming the filtered spectrum from the spectrum domain into the frequency domain. Optionally, the inter carrier interference gain estimation block 514 comprises a circuit 514a for transforming the estimates of inter carrier interference gains from frequency domain into spectrum domain, for filtering the spectrum for determining a filtered spectrum, and for transforming the filtered spectrum from the spectrum domain into the frequency domain. Decision aided channel gain estimation block 510 is connected to the input port 502, the decision block 506 and to a node 512 interposed between the decision block 506 and the output port 508. The decision aided channel gain estimation block 510 determines an estimate of channel gain at each subcarrier corresponding to a principal diagonal vector of a channel frequency response matrix and for providing the estimate of channel gain at each subcarrier to the decision block 506. The block 514 determines an estimate of inter carrier interference gains at each subcarrier corresponding to off-diagonal vectors of the channel frequency response matrix in dependence upon the received signal and the decision signal. ICI coefficient estimation is performed in ICI coefficient block 514—k parallel blocks, i.e. one block for each off-diagonal vector or, alternatively, in series. Optionally, the decision block 506 and/or the decision aided channel gain estimation block 510, inter carrier interference gain estimation block 514 comprises a filter circuit. Numerous other embodiments may be envisaged without departing from the spirit or scope of the invention.

Figure 27:
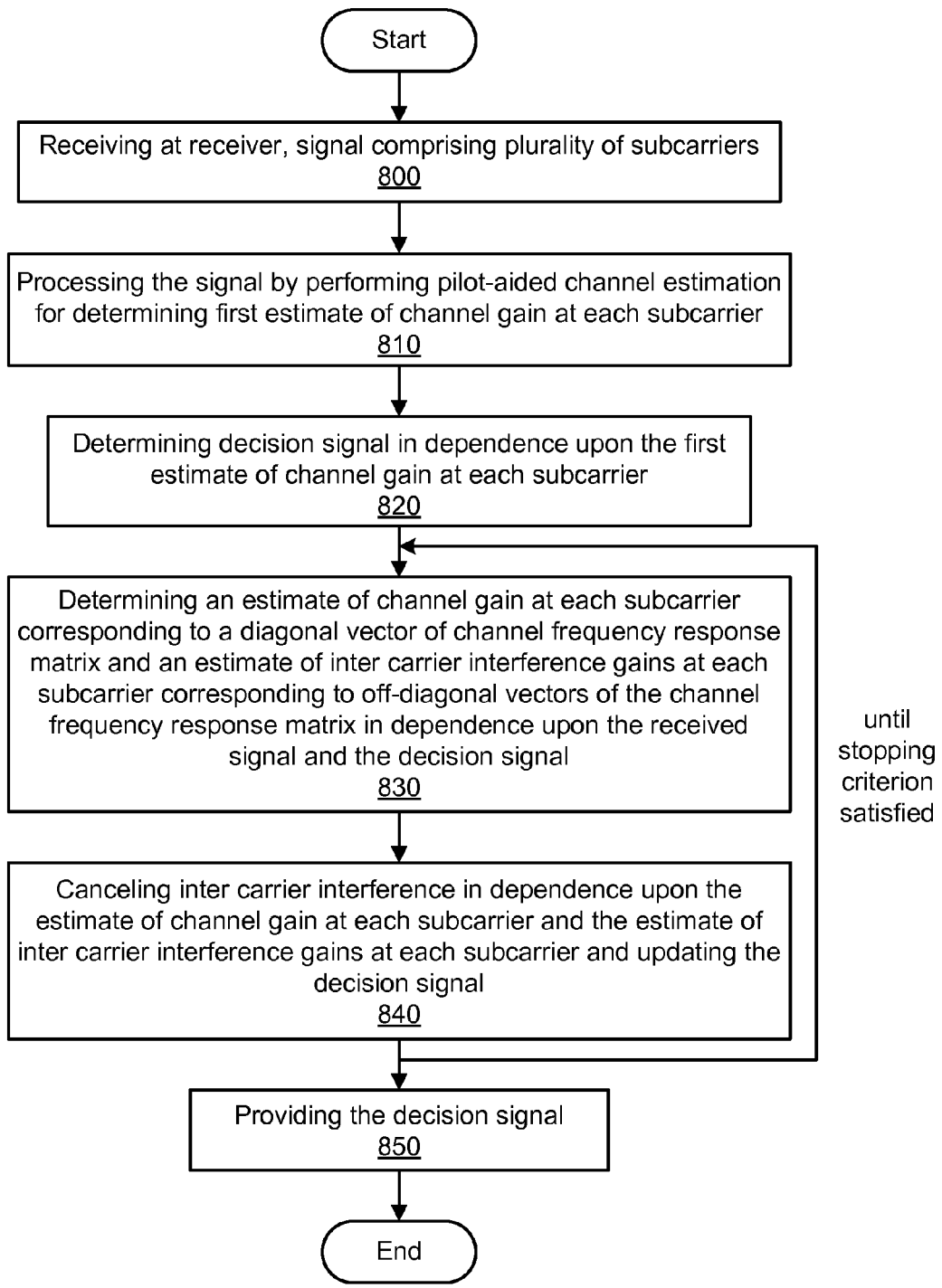
FIG. 27 is a functional block diagram of a method according to an embodiment of the invention.

Referring to FIG. 27, a functional block diagram of a method according to an embodiment of the invention is shown. The first step 800 comprises receiving at a receiver a signal comprising a plurality of subcarriers. At step 810 processing the signal occurs by performing pilot-aided channel estimation for determining a first estimate of channel gain at each subcarrier. The next step 820 comprises determining a decision signal in dependence upon the first estimate of channel gain at each subcarrier after which the method determines at 830 an estimate of channel gain at each subcarrier corresponding to a diagonal vector of a channel frequency response matrix and an estimate of inter carrier interference gains at each subcarrier corresponding to off-diagonal vectors of the channel frequency response matrix in dependence upon the received signal and the decision signal. Thereafter, the method comprises the step of 840 canceling inter carrier interference in dependence upon the estimate of channel gain at each subcarrier and the estimate of inter carrier interference gains at each subcarrier and updating a decision signal. Thereafter, steps 830 and 840 are repeated until a stopping criterion is satisfied. A final step 850 provides the decision signal.

Figure 28:
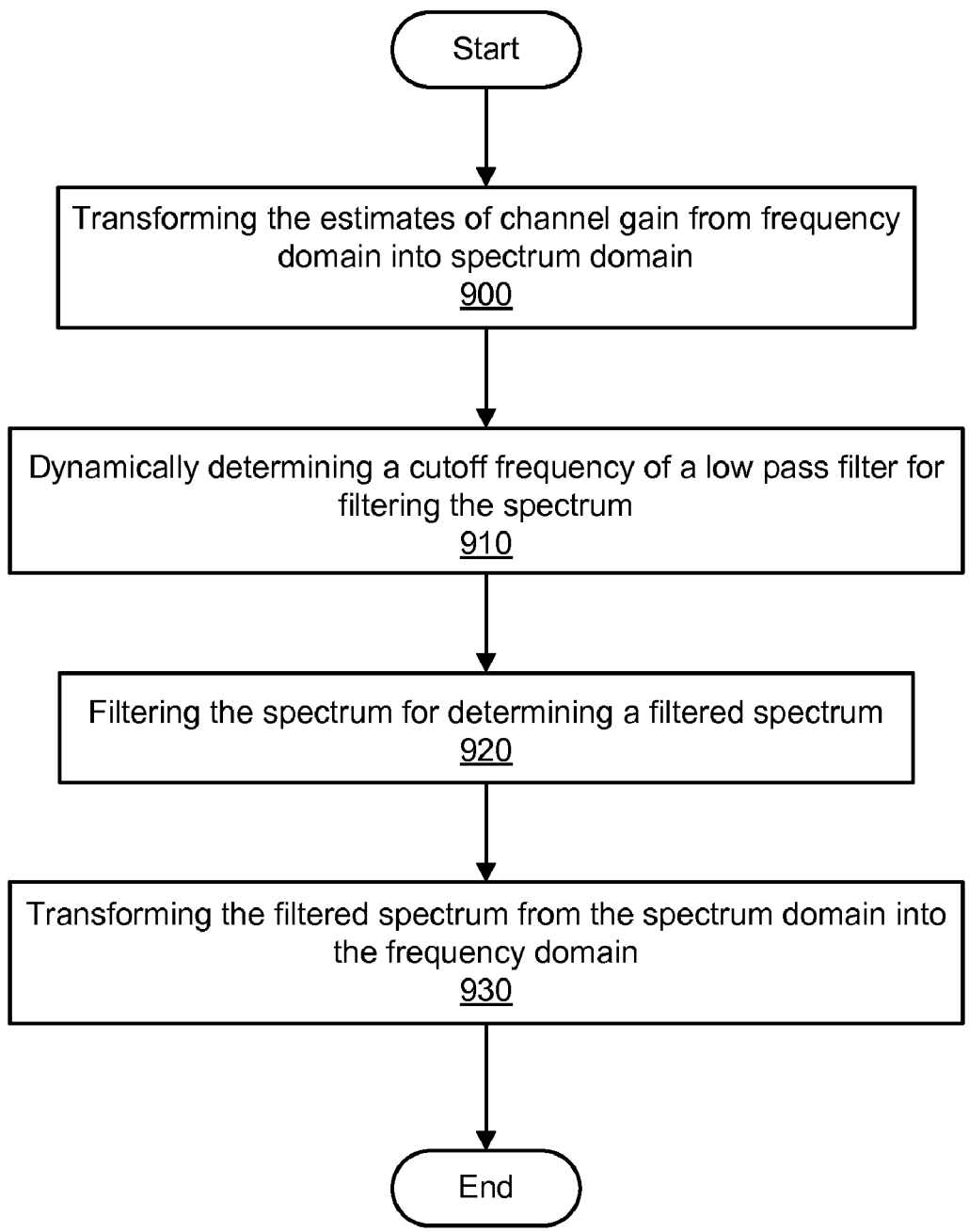
FIG. 28 is a functional block diagram of additional method steps according to an embodiment of the invention which is an augmented version of the embodiment depicted in FIG. 27.

Referring to FIG. 28, a functional block diagram of additional method steps according to an embodiment of the invention which is an augmented version of the embodiment depicted in FIG. 27, is shown. In addition to the steps depicted in FIG. 27, the embodiment illustrated in FIG. 28 includes the steps of 900 transforming the estimates of channel gain from frequency domain into spectrum domain, 910 dynamically determining a cutoff frequency of a low pass filter for filtering the spectrum, 920 filtering the spectrum for determining a filtered spectrum; and 930 transforming the filtered spectrum from the spectrum domain into the frequency domain.

Figure 29:
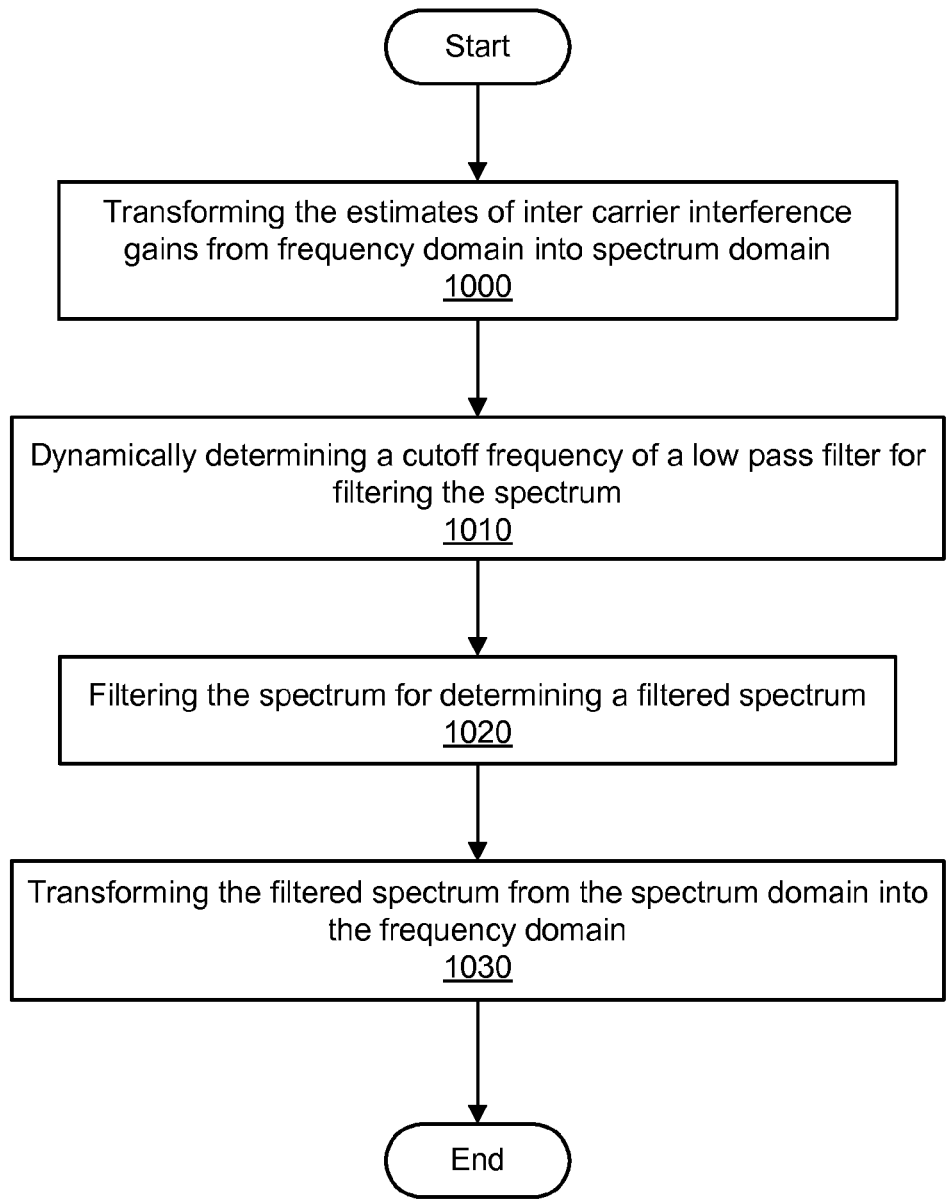
FIG. 29 is a functional block diagram of additional method steps according to a another embodiment of the invention which is an augmented version of the embodiment depicted in FIG. 27.

Referring to FIG. 29, a functional block diagram of additional method steps according to an embodiment of the invention which is an augmented version of the embodiment depicted in FIG. 27, is shown. In addition to the steps depicted in FIG. 27, the embodiment illustrated in FIG. 29 includes the steps of 1000 transforming the estimates of inter carrier interference gains from frequency domain into spectrum domain, 1010 dynamically determining a cutoff frequency of a low pass filter for filtering the spectrum, 1020 filtering the spectrum for determining a filtered spectrum; and 1030 transforming the filtered spectrum from the spectrum domain into the frequency domain.

Figure 30:
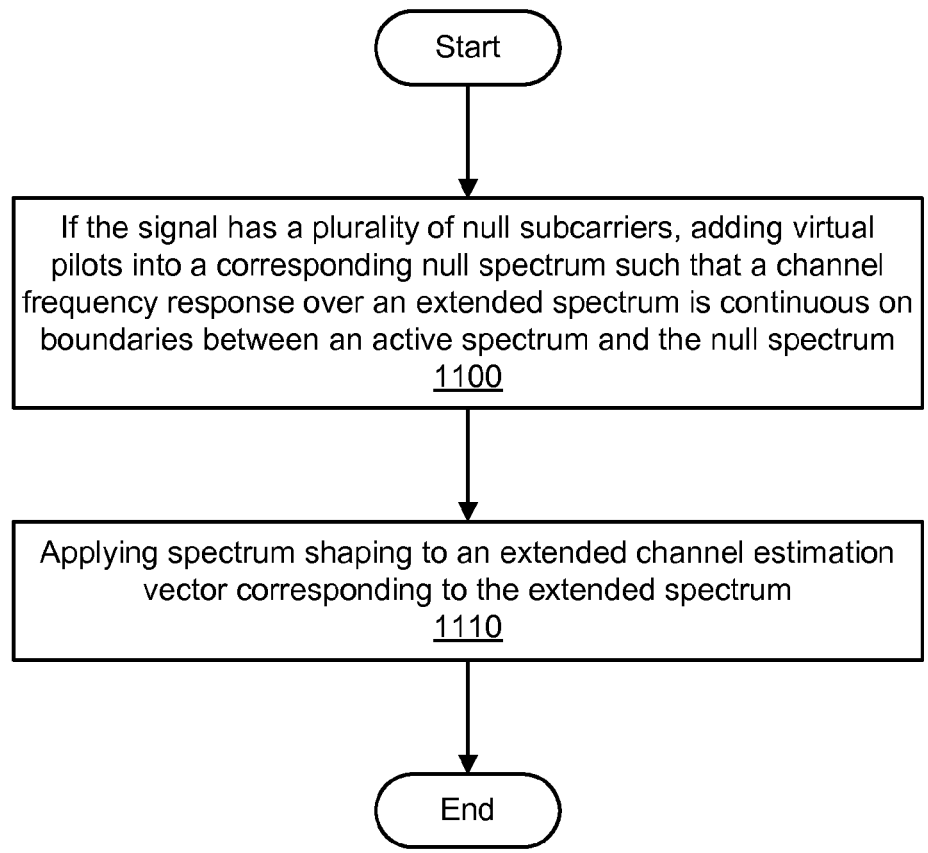
FIG. 30 is a functional block diagram of additional method steps according to a further embodiment of the invention which is an augmented version of the embodiment depicted in FIG. 27.

Referring to FIG. 30, a functional block diagram of additional method steps according to an embodiment of the invention which is an augmented version of the embodiment depicted in FIG. 27, is shown. In addition to the steps depicted in FIG. 27, the embodiment illustrated in FIG. 30 includes the steps of 1100, if the signal has a plurality of null subcarriers, the method comprises adding virtual pilots into a corresponding null spectrum such that a channel frequency response over an extended spectrum is continuous on boundaries between an active spectrum and the null spectrum, and step 1110, in which the method includes applying spectrum shaping to an extended channel estimation vector corresponding to the extended spectrum.

Figure 31:
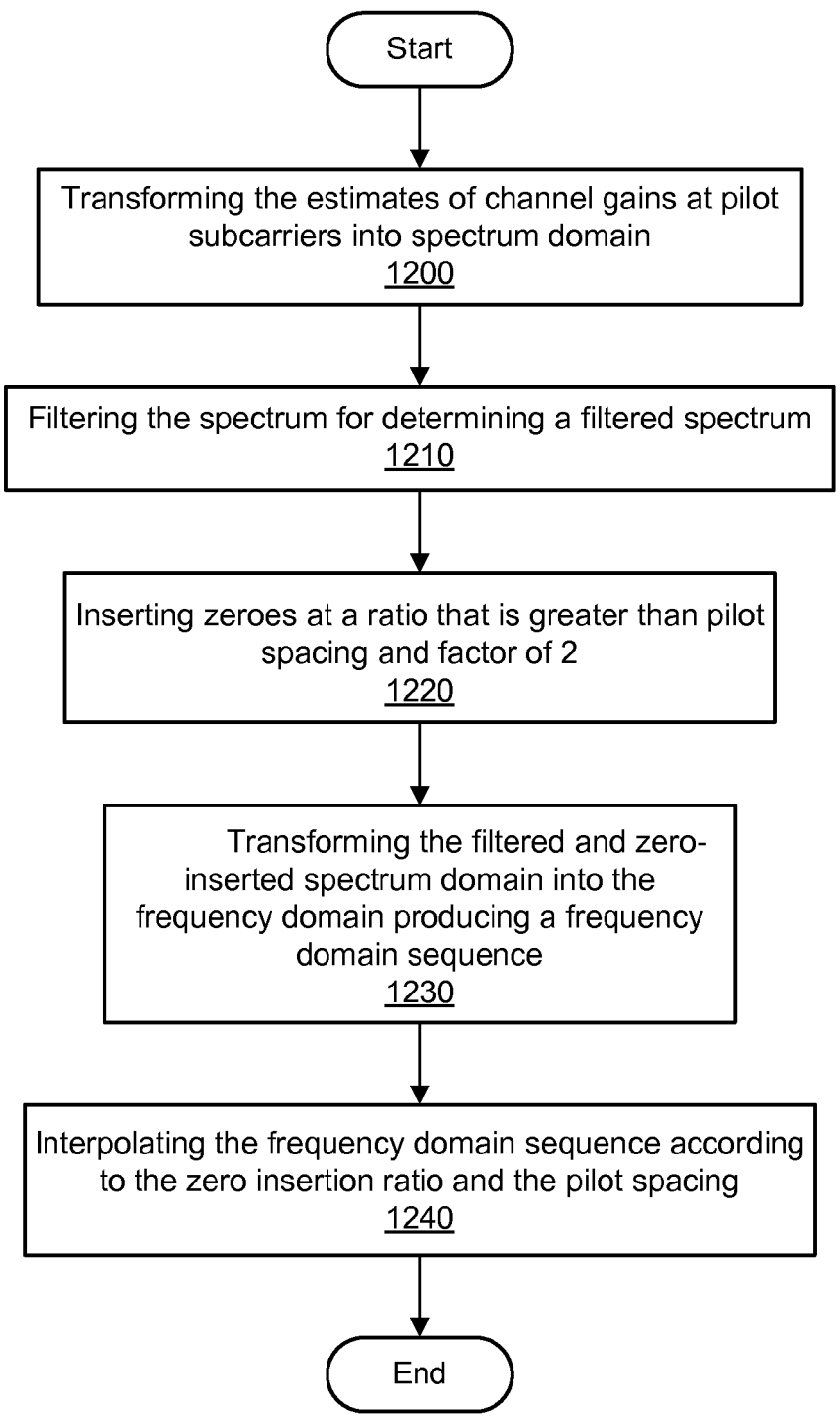
FIG. 31 is a functional block diagram of additional method steps according to another further embodiment of the invention which is an augmented version of the embodiment depicted in FIG. 27.

Referring to FIG. 31, a functional block diagram of additional method steps according to an embodiment of the invention which is an augmented version of the embodiment depicted in FIG. 27, is shown. In addition to the steps depicted in FIG. 27, the embodiment illustrated in FIG. 31 includes, if the received signal comprises pilots with non-factor of 2 spacing, the steps of 1200 transforming the estimates of channel gains at pilot subcarriers into spectrum domain, 1210 filtering the spectrum for determining a filtered spectrum, 1220 inserting zeroes at a ratio that is greater than pilot spacing and factor of 2, 1230 transforming the filtered and zero-inserted spectrum domain into the frequency domain producing a frequency domain sequence, and 1240 interpolating the frequency domain sequence according to the zero insertion ratio and the pilot spacing.

Figure 32:
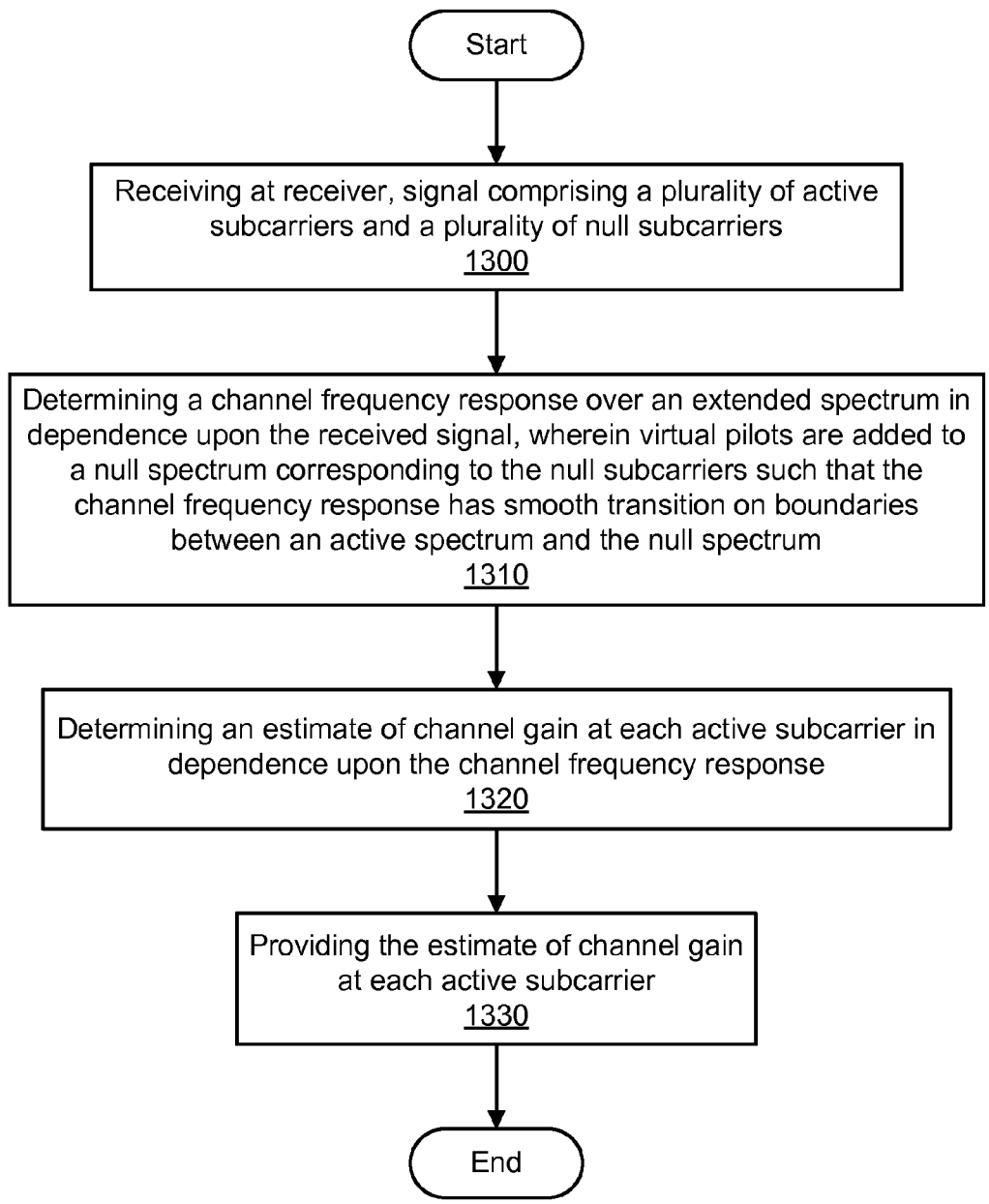
FIG. 32 is a functional block diagram of a further method according to an embodiment of the invention.

Referring to FIG. 32, a functional block diagram of a method according to an embodiment of the invention is shown. The first step 1300, comprises receiving at a receiver a signal, the signal comprising a plurality of active subcarriers and a plurality of null subcarriers. At step 1310, determining a channel frequency response over an extended spectrum is performed in dependence upon the received signal, wherein virtual pilots are added to a null spectrum corresponding to the null subcarriers such that the channel frequency response has smooth transition on boundaries between an active spectrum and the null spectrum. The next step 1320 comprises determining an estimate of channel gain at each active subcarrier in dependence upon the channel frequency response. A final step 1330 comprises providing the estimate of channel gain at each active subcarrier.

Numerous other embodiments may be envisaged without departing from the spirit or scope of the invention.

What is claimed is:

1. A method comprising:
    a) receiving at a receiver a signal, the signal comprising a plurality of subcarriers;
    b) processing the signal by performing pilot-aided channel estimation for determining a first estimate of channel gain at each subcarrier;
    c) determining a decision signal in dependence upon the first estimate of channel gain at each subcarrier;
    d) determining an estimate of channel gain at each subcarrier corresponding to a diagonal vector of a channel frequency response matrix and an estimate of inter carrier interference gains at each subcarrier corresponding to off-diagonal vectors of the channel frequency response matrix in dependence upon the received signal and the decision signal;
    e) canceling inter carrier interference in dependence upon the estimate of channel gain at each subcarrier and the estimate of inter carrier interference gains at each subcarrier and updating the decision signal;
    f) repeating d) and e) until a stopping criterion is satisfied; and
    g) providing the decision signal.

2. A method as defined in claim 1 wherein the inter carrier interference gains are determined based upon a strong correlation between inter carrier interference gains within each off-diagonal vector in the channel frequency response matrix.

3. A method as defined in claim 2 wherein the inter carrier interference gains are determined based upon a linear relationship between the inter carrier interference coefficient vectors.

4. A method as defined in claim 2 wherein estimates of inter carrier interference gains from a $1^{st}$ neighbor subcarrier at each subcarrier are determined and wherein the estimates of the remaining inter carrier interference gains are obtained by scaling the estimates of inter carrier interference gains from the $1^{st}$ neighbor subcarrier.

5. A method as defined in claim 1 further comprising:
    transforming the estimates of channel gain from frequency domain into spectrum domain;
    filtering the spectrum for determining a filtered spectrum; and
    transforming the filtered spectrum from the spectrum domain into the frequency domain.

6. A method as defined in claim 5 further comprising dynamically determining a cutoff frequency of a low pass filter for filtering the spectrum.

7. A method as defined in claim 5 wherein a window of a filter for filtering the spectrum has substantially a size of a maximum multi-path delay.

8. A method as defined in claim 1 wherein the channel gain is filtered using one of:
a Wiener filter;
Inverse Discrete Fourier Transform/Discrete Fourier Transform (IDFT/DFT)-filtering; and
a Wiener filter and IDFT/DFT-filtering.

9. A method as defined in claim 1 further comprising:
transforming the estimates of inter carrier interference gains from frequency domain into spectrum domain;
filtering the spectrum for determining a filtered spectrum; and
transforming the filtered spectrum from the spectrum domain into the frequency domain.

10. A method as defined in claim 9 further comprising dynamically determining a cutoff frequency of a low pass filter for filtering the spectrum.

11. A method as defined in claim 9 wherein a window of a filter for filtering the spectrum has a size of a maximum multi-path delay.

12. A method as defined in claim 9 wherein the inter carrier interference gains are filtered using one of:
a Wiener filter;
Inverse Discrete Fourier Transform/Discrete Fourier Transform (IDFT/DFT)-filtering; and
a Wiener filter and IDFT/DFT-filtering.

13. A method as defined in claim 1 wherein c) the decision signal is determined using a one-tap equalizer with inter carrier interference cancellation.

14. A method as defined in claim 1 wherein e) the decision signal is updated using a (2K+1)-tap equalizer with inter carrier interference cancellation.

15. A method as defined in claim 1 wherein the stopping criterion is a predetermined number of iterations.

16. A method as defined in claim 1 wherein the stopping criterion is determined from a performance indicator by the receiver, including but not limited to pseudo channel bit error rate.

17. A method as defined in claim 1 wherein the decision includes error correction decoding.

18. A method as defined in claim 1 wherein the received signal comprises a plurality of null subcarriers, the method further comprising adding virtual pilots into a corresponding null spectrum such that a channel frequency response over an extended spectrum is continuous on boundaries between an active spectrum and the null spectrum.

19. A method as defined in claim 18 wherein a channel frequency response in the null spectrum is determined using zero-padding.

20. A method as defined in claim 18 wherein a channel frequency response in the null spectrum is determined using smooth-padding.

21. A method as defined in claim 18 wherein a channel frequency response in the null spectrum is determined using symmetric-padding.

22. A method as defined in claim 18 wherein a channel frequency response in the null spectrum is determined using repeat-padding.

23. A method as defined in claim 18 further comprising applying spectrum shaping to an extended channel estimation vector corresponding to the extended spectrum.

24. A method as defined in claim 23 wherein a Hanning window is used for the spectrum shaping.

25. A method as defined in claim 23 further comprising determining an optimum shaping window.

26. A method as defined in claim 1 wherein the received signal comprises pilots with non-factor of 2 spacing, the method further comprising:
transforming the estimates of channel gains at pilot subcarriers into spectrum domain;
filtering the spectrum for determining a filtered spectrum;
inserting zeroes at a ratio that is greater than pilot spacing and factor of 2;
transforming the filtered and zero-inserted spectrum domain into the frequency domain producing a frequency domain sequence; and
interpolating the frequency domain sequence according to the zero insertion ratio and the pilot spacing.

27. A method comprising:
receiving at a receiver a signal, the signal comprising a plurality of active subcarriers and a plurality of null subcarriers;
determining a channel frequency response over an extended spectrum in dependence upon the received signal, wherein virtual pilots are added to a null spectrum corresponding to the null subcarriers such that the channel frequency response has smooth transition on boundaries between an active spectrum and the null spectrum;
determining an estimate of channel gain at each active subcarrier in dependence upon the channel frequency response; and
providing the estimate of channel gain at each active subcarrier.

28. A method as defined in claim 27 wherein a channel frequency response in the null spectrum is determined using smooth-padding.

29. A method as defined in claim 27 wherein a channel frequency response in the null spectrum is determined using symmetric-padding.

30. A method as defined in claim 27 wherein a channel frequency response in the null spectrum is determined using repeat-padding.

31. A method as defined in claim 27 further comprising applying spectrum shaping to an extended channel estimation vector corresponding to the extended spectrum.

32. A method as defined in claim 31 wherein a Hanning window is used for the spectrum shaping.

33. A method as defined in claim 31 further comprising determining an optimum shaping window.

34. A receiver comprising:
an input port for receiving a signal, the signal comprising a plurality of subcarriers;
a pilot-aided channel estimator connected to the input port, the pilot-aided channel estimator for processing the signal by performing pilot-aided channel estimation for determining a first estimate of channel gain at each subcarrier;
a decision block connected to the pilot-aided channel estimator and to the input port, the decision block for determining a decision signal in dependence upon an estimate of channel gain at each subcarrier and an estimate of inter carrier interference gains at each subcarrier;
an output port connected to the decision block for providing the decision signal; and
a decision aided channel estimation block connected to the input port, the decision block and to a node interposed between the decision block and the output port, the decision aided channel estimation block for determining an estimate of channel gain at each subcarrier corresponding to a diagonal vector of a channel frequency response matrix and an estimate of inter carrier interference gains at each subcarrier corresponding to off-diagonal vectors of the channel frequency response matrix in dependence upon the received signal and the decision signal and for providing the estimate of channel gain at each subcarrier to the decision block.

35. A receiver as defined in claim 34 wherein the decision aided channel estimation block comprises a filter.

36. A receiver as defined in claim 35 wherein the decision aided channel estimation block comprises a circuit for:
    transforming the estimates of channel gain from frequency domain into spectrum domain;
    filtering the spectrum for determining a filtered spectrum; and
    transforming the filtered spectrum from the spectrum domain into the frequency domain.

37. A receiver as defined in claim 35 wherein the decision aided channel estimation block comprises a circuit for:
    transforming the estimates of intercarrier interference gain from frequency domain into spectrum domain;
    filtering the spectrum for determining a filtered spectrum; and
    transforming the filtered spectrum from the spectrum domain into the frequency domain.

38. A receiver as defined in claim 35 wherein the decision aided channel estimation block comprises a circuit for performing on the estimates of channel gain one of:
    Wiener filtering;
    Discrete Fourier Transform/Inverse Discrete Fourier Transform (DFT/IDFT) filtering; and
    Wiener filtering and Discrete Fourier Transform/Inverse Discrete Fourier Transform (DFT/IDFT) filtering.

39. A receiver as defined in claim 35 wherein the decision aided channel estimation block comprises a circuit for performing on the estimates of inter carrier interference one of:
    Wiener filtering;
    Discrete Fourier Transform/Inverse Discrete Fourier Transform (DFT/IDFT) filtering; and
    Wiener filtering and Discrete Fourier Transform/Inverse Discrete Fourier Transform (DFT/IDFT) filtering.

40. A receiver as defined in claim 34 wherein the decision block comprises a filter.

41. A receiver as defined in claim 34 where the decision block comprises an error correction decoder.

* * * * *